(12) United States Patent
Houk et al.

(10) Patent No.: US 11,982,624 B2
(45) Date of Patent: May 14, 2024

(54) CARBON FIBER CLASSIFICATION USING RAMAN SPECTROSCOPY

(71) Applicant: BATTELLE SAVANNAH RIVER ALLIANCE, LLC, Aiken, SC (US)

(72) Inventors: Amanda L. Houk, Aiken, SC (US); Matthew S. Wellons, Aiken, SC (US); Ross J. Smith, North Augusta, SC (US); Joshua T. Hewitt, Standardsville, VA (US)

(73) Assignee: Battelle Savannah River Alliance, LLC, Aiken, SC (US)

( * ) Notice: Subject to any disclaimer, the term of this patent is extended or adjusted under 35 U.S.C. 154(b) by 750 days.

(21) Appl. No.: 17/079,609

(22) Filed: Oct. 26, 2020

(65) Prior Publication Data

US 2022/0128473 A1    Apr. 28, 2022

(51) Int. Cl.
*G01N 21/65*    (2006.01)
*D01F 9/12*    (2006.01)
*G01J 3/28*    (2006.01)
*G01J 3/44*    (2006.01)

(52) U.S. Cl.
CPC .............. *G01N 21/65* (2013.01); *D01F 9/12* (2013.01); *G01J 3/4412* (2013.01); *G01J 2003/283* (2013.01); *G01J 2003/2869* (2013.01); *G01J 2003/2873* (2013.01)

(58) Field of Classification Search
CPC .......... G01N 21/65; D01F 9/12; G01J 3/4412; G01J 2003/283; G01J 2003/2869; G01J 2003/2873; G01J 3/28; G01J 3/44
See application file for complete search history.

(56) References Cited

U.S. PATENT DOCUMENTS

| 4,915,926 A | 4/1990 | Lahijani |
| 4,929,513 A | 5/1990 | Kyono et al. |
| 4,983,457 A | 1/1991 | Hino et al. |
| 5,610,836 A | 3/1997 | Alsmeyer et al. |
| 5,684,580 A | 11/1997 | Cooper et al. |

(Continued)

FOREIGN PATENT DOCUMENTS

| CN | 101949827 | 1/2011 |
| CN | 101949828 | 1/2011 |

(Continued)

OTHER PUBLICATIONS

Afanasyeva, et al. "Micro-Raman spectroscopic measurements on carbon fibers" *Vibrat. Spect.* 11 (1996) pp. 79-83.

(Continued)

*Primary Examiner* — Alexander Satanovsky
(74) *Attorney, Agent, or Firm* — Dority & Manning, P.A.

(57) ABSTRACT

Carbon fiber characterization processes are described that include multi-condition Raman spectroscopy-based examination combined with multivariate data analyses. Methods are a nondestructive material characterization approach that can provide predictions as to carbon fiber bulk physical properties, as well as identification of unknown carbon fiber materials for quality control purposes. The framework of the multivariate analysis methods includes a principal component-based identification protocol including comparison of Raman spectral data from an unknown carbon fiber with a data library of multiple principal component spaces.

21 Claims, 11 Drawing Sheets

(56) References Cited

U.S. PATENT DOCUMENTS

| | | | |
|---|---|---|---|
| 7,214,430 B2 | 5/2007 | Handa et al. | |
| 7,504,153 B2 | 3/2009 | Kurose et al. | |
| 7,569,161 B2 | 8/2009 | Nagao et al. | |
| 7,955,699 B2 | 6/2011 | Handa et al. | |
| 8,603,620 B2 | 12/2013 | Hitoe et al. | |
| 8,902,423 B2 | 12/2014 | Myrick et al. | |
| 9,114,992 B2 | 8/2015 | Yamamoto et al. | |
| 9,460,827 B2 | 10/2016 | Khe et al. | |
| 9,504,151 B2 | 11/2016 | Kobayashi et al. | |
| 2004/0119972 A1* | 6/2004 | Smit-Kingma | G01N 21/95 356/238.1 |
| 2006/0062715 A1 | 3/2006 | Endo et al. | |
| 2011/0159270 A9 | 6/2011 | Davis et al. | |
| 2012/0251763 A1 | 10/2012 | Yamamoto et al. | |
| 2012/0282453 A1 | 11/2012 | Wang et al. | |
| 2014/0054179 A1 | 2/2014 | Yamamoto et al. | |
| 2014/0162063 A1 | 6/2014 | Dzenis | |
| 2015/0067940 A1* | 3/2015 | Sayre | F41H 1/02 264/234 |
| 2016/0224698 A1 | 8/2016 | Rassaian et al. | |
| 2017/0268142 A1* | 9/2017 | Tokuno | D06M 13/148 |
| 2020/0348224 A1* | 11/2020 | Long | G01N 21/211 |

FOREIGN PATENT DOCUMENTS

| | | | | |
|---|---|---|---|---|
| CN | 102866142 | | 1/2013 | |
| CN | 105866097 | | 8/2016 | |
| CN | 108195818 | * | 6/2018 | ............ G01N 21/65 |
| DE | 102015200836 | | 7/2016 | |
| EP | 1243679 | | 12/2006 | |
| JP | S 61225325 | | 10/1986 | |
| JP | 2002-319357 | | 10/2002 | |
| JP | 2004-150408 | | 5/2004 | |
| JP | 2004149980 | | 5/2004 | |
| JP | 2004149981 | | 5/2004 | |
| JP | 2008163535 | | 7/2008 | |
| JP | 2008223133 | | 9/2008 | |
| JP | 2008266702 | | 11/2008 | |
| JP | 2010-047865 | | 3/2010 | |
| JP | 4582819 | | 11/2010 | |
| JP | 2013108201 | | 6/2013 | |
| JP | 5452288 | | 3/2014 | |
| JP | 2015170659 | * | 9/2015 | ............ H01L 35/22 |
| JP | 2016045167 | | 4/2016 | |
| WO | WO 2011/088539 | | 7/2011 | |
| WO | WO 2016/138469 | | 9/2016 | |

OTHER PUBLICATIONS

Ager, et al. "Laser heating effects in the characterization of carbon fibers Raman spectroscopy" *J. Appl. Phys.* 68 (1990) pp. 3598-3608.
Akbar, et al. "Study of high radio frequency plasma discharge effects on carbon fiber using Raman spectroscopy" *Surf. Coat. Tech.* 240 (2014) pp. 233-242.
Benedikt, et al. "Measurement and modeling of internal stresses at microscopic and mesoscopic levels using micro-Raman spectroscopy and X-ray diffraction" *Powd. Diffract.* 21 (2006) pp. 118-121.
Bowden, et al. "Determination of bandshifts as a function of strain in carbon fibers using Raman microline focus spectrometry (MiFS)" *Carbon* 31 (1993) pp. 1057-1060.
Boyer, H. "Application example of Raman microanalysis" *Spectrochimica Acta B* 39B (1984) pp. 1527-1532. (Abstract only).
Brzezinka, et al. "Micro Raman spectroscopy on a single carbon fiber under stress" *Fresenius' J. Anal. Chem.* 352 (1995) pp. 486-488.
Cao, et al. "Evolution of crystallite size La of PAN-based carbon fiber during heat treatment process" *Yuhang Cailiao Gongyi* 41 (2011) pp. 61-65.
Cao, et al. "Raman spectra of PAN-based carbon fibers during surface treatment" *Guangpuxue Yu Guangpu Fenxi* 28 (2008) pp. 2885-2889. (Abstract only).

Chen, et al. "Research on microstructure and properties of two kinds of T700 carbon fibers" *Gaofenzi Tongbao* 5 (2015) pp. 69-75.
Cheng, et al. "Raman microspectroscopy on rayon-based carbon fibers activated at different temperatures" *Tansu Jishu* 35 (2016) pp. 11-14.
Farquharson, et al. "Detection of environmental deterioration in fiber reinforced composites by FT-Raman spectroscopy—Phase I" *Adv. Fuel Res.* AD-A279763 (1994) pp. 1-47.
Fitzer, et al. "Laser Raman spectroscopy for determination of the carbon-carbon bonding length in carbon" *Carbon* 26 (1988) pp. 594-595.
Fitzer, et al. "Application of laser-Raman spectroscopy for characterization of carbon fibers" *High Temp. High Press.* 19 (1987) pp. 537-544.
Hu, et al. "Simultaneous measurement of thermal properties and convective heat transfer coefficient of individual carbon fiber using Raman spectroscopy" *Huagong Xuebao* 65 (2014) pp. 251-257.
Hua, et al. "Characterization and properties of PAN-based high modulus carbon fibers" *Carbon* 48 (2010) pp. 314-317. (Abstract only).
Huang, et al. "Testing and characterization of hygrothermal stresses in carbon fibers reinforced epoxy composites using Raman spectroscopy" *Acta Materiae Compositae Sinica* 26 (2009) pp. 22-28. (Abstract only).
Huang, et al. "Effect of fiber microstructure upon the modulus of PAN- and pitch-based carbon fibers" *Carbon* 33 (1995) pp. 97-107.
Huang, et al. "Microstructure and mechanical properties of pitch-based carbon fibers" *J. Mater. Sci.* 29 (1994) pp. 4027-4036.
Jensen, et al. "Interfacial properties of carbon fibre-epoxy composites under fatigue loading" *Proc. Risoe Int'l Symp. Mater. Sci. Interf. Des. Polym. Matrix Comp.* (2007) pp. 199-205.
Kong, et al. "PAN fiber diameter effect on the structure of PAN-based carbon fibers" *Fibers Poly.* 15 (2014) pp. 2480-2488.
Lavine, B.K. "Clustering and Classification of Analytical Data" *Encycl. Analy. Chem.* John Wiley & Sons Ltd. (2006) pp. 1-21.
Lei, et al. "Raman spectroscopy investigation of structural and textural change in C/C composites during braking" *J. Cent. S. Univ. Tech.* 18 (2011) pp. 29-35.
Lévêque, et al. "Study of carbon-fiber strain in model composites Raman spectroscopy" *Comp. Sci. Tech.* 56 (1996) pp. 749-754.
Li, et al. "Structural heterogeneity and its influence on the tensile fracture of PAN-based carbon fibers" *RSC Adv.* 4 (2014) pp. 60648-60651.
Li, et al. "The effect of gamma ray irradiation on PAN-based intermediate modulus carbon fibers" *J. Nucl. Mater.* 443 (2013) pp. 26-31.
Li, et al. "Comparison of structure and properties in different polyacrylonitrile-based carbon fibers" *Cailiao Daobao* 25 (2011) pp. 51-55, 69. (Abstract only).
Li, et al. "Raman spectra of PAN-based carbon fibers during graphitization" *Guangpuxue Yu Guangpu Fenxi* 27 (2007) pp. 2249-2253. (Abstract only).
Liu, et al. "Simultaneous measurement of thermal conductivity and thermal contact resistance of individual carbon fibers using Raman spectroscopy" *Rev. Sci. Instr.* 84:044901 (2013) pp. 1-5.
Liu, et al. "Study on effect of heat treatment temperature on core-shell structure evolution of carbon fibers Raman spectroscopy" *Guangpuxue Yu Guangpu Fenxi* 28 (2008) pp. 1819-1822.
Liu, et al "Study of the microstructure and the mechanical properties of high strength PAN-based carbon fibers" *Gongneng Cailiao* 38 (2007) pp. 1723-1726, 1730. (Abstract only).
Liu, et al. "Microstructure analysis of carbon-carbon preform" *J. Mater. Res.* 19 (2004) pp. 2124-2130.
Melanitis, et al. "Characterization of PAN-based carbon fibers with laser Raman spectroscopy. Part I. Effect of processing variables on Raman band profiles" *J. Mater. Sci.* 31 (1996) pp. 851-860.
Meyer, et al. "Raman spectroscopy of carbon fibers" *Fresenius' J. Anal. Chem.* 349 (1994) pp. 167-168. (Abstract Prev. only).
Miyake, T. "Ch. 5: Measuring fiber strain and creep behavior in polymer matrix composites using Raman spectroscopy" *Creep Fatig. Polym. Matrix Comp.* Woodhead Publishing Ltd. (2011) pp. 149-183.

(56) References Cited

OTHER PUBLICATIONS

Miyake, et al. "Prediction of creep life of uni-directional composites based on measurement of the fiber stress using micro-Raman spectroscopy" *Nagoya-shi Kogyo Kenkyusho Kenkyu Hokoku* 91 (2006) pp. 1-4.

Miyake, et al. "Measurement of stress relaxation in broken fibers embedded in epoxy using Raman spectroscopy" *J. Mater. Sci.* 33 (1998) pp. 5177-5183.

Miyake, et al. "Evaluation of stress relaxation in a broken fiber for a single carbon fiber/epoxy composite Raman spectroscopy" *Trans. Jap. Soc. Mech. Eng. A* 64 (1998) pp. 981-987. (Abstract only).

Musiol, et al. "Comparative study of the structure and microstructure of PAN-based nano- and micro-carbon fibers" *Ceram. Int'l* 42 (2016) pp. 11603-11610.

Nelyub, et al. "Study of level of structural disorder in carbon fibers Raman spectroscopy" *VSE Materialy* 3 (2013) pp. 38-42.

Nor, et al. "Raman spectroscopy and field emission scanning electron microscopic studies on carbon nanomaterials" *Adv. Mater. Res.* 364 (2012) pp. 20-24.

Ren, et al. "Raman spectroscopy studies on the microstructure evolution from cellulose to carbon fiber" *Mater. Sci. Forum* 789 (2014) pp. 157-162.

Reznik, B. "Structural analysis of carbon-fiber/pyrolytic carbon matrix composites" *High Temperature Ceramic Matrix Composites 8: Ceram. Trans.* 248 Wiley-VCH (2014) pp. 487-490.

Saenko, et al. "Estimation of size of graphite nanoparticles-structural blocks of activated carbon fibers stimulation of X-ray diffraction profile" *Izvestiya Vysshikh Uchebnykh Zavedenii, Khimiya i Khimicheskaya Tekhnologiya* 56 (2013) pp. 46-49.

Sato, et al. "Application of laser Raman spectroscopy to the analysis of stress distribution of fibers in composites" *J. Mater. Sci. Lett.* 11 (1992) pp. 365-366.

Su, et al. "Evolution of the skin-core structure of PAN-based carbon fibers with high temperature treatment" *New Carbon Mater.* 27 (2012) pp. 288-293. (Abstract only).

Tanaka, et al. "Investigation of the sp3 structure of carbon fibres using UV-Raman spectroscopy" *Tanso* 259 (2013) pp. 243-247.

Tatsuda, et al. "Fiber stress analysis in short fiber reinforced composites means of laser Raman spectroscopy" *Comp. Interf.* 6 (1998) pp. 201-213. (Abstract only).

Tatsuda, et al. "Stress analysis in deformed composites means of laser Raman spectroscopy" *Proc. Jap.-U.S. Conf. Comp. Mater.* (1995) pp. 99-104.

Tatsuda, et al. "Laser Raman spectroscopy for fiber stress analysis in composites" Trans. Mater. Res. Soc. Jap. (1994) pp. 897-900.

Van Den Heuvel, et al. "Analysis of stress concentrations in multi-fiber micro composites means of Raman spectroscopy" *J. Mater. Sci. Lett.* 15 (1996) pp. 1908-1911.

Wang, et al. "Characterization of the orientation of graphite structures of polyacrylonitrile (PAN)-based carbon fibers by Raman spectroscopy" *Beijing Huagong Daxue Xuebao, Ziran Kexueban* 41 (2014) pp. 66-70.

Wang, et al. "The effect of graphitization temperature on the microstructure and mechanical properties of carbon fibers" *Xinxing Tan Cailiao* 20 (2005) pp. 157-163.

Washer, et al. "Developing Raman spectroscopy for the nondestructive testing of carbon fiber composites" *Mater. Eval.* 69 (2011) pp. 1219-1226. (Abstract only).

Washer, et al. "Raman spectroscopy for the nondestructive testing of carbon fiber" *Res. Lett. Mater. Sci.* 2008:693207 (2008) pp. 1-3.

Wu, et al. "Microstructure difference on skin and core of domestic PAN-based carbon fibers characterized by Raman spectroscopy" *Zhongguo Youse Jinshu Xuebao* 25 (2015) pp. 2131-2138.

Young, R.J. "Monitoring deformation processes in high-performance fibers using Raman spectroscopy" *J. Text. Inst.* 86 (1995) pp. 360-381.

Young, et al. "Analysis of composite test methods using Raman spectroscopy" *Plast. Rubb. Comp. Process. Appl.* 23 (1995) pp. 11-19. (Abstract only).

Young, et al. "Raman spectroscopy of composites" *High Perform. Compos. Proc. Int. Symp.* (1994) 263-74.

Zafar, et al. "Investigation of the long term effects of moisture on carbon fibre and epoxy matrix composites" *Comp. Sci. Tech.* 72 (2012) pp. 656-666.

Zhang, et al. "Study of the surface morphology and the microstructure of PAN-based carbon fibers" *Adv. Mater. Res.* 239-242 (2011) pp. 1279-1282.

Zhang, et al. "Study of the microstructure of PAN-based carbon fibers" *Beijing Huagong Daxue Xuebao, Ziran Kexueban* 35 (2008) pp. 57-60.

Zickler, et al. "A reconsideration of the relationship between the crystallite size $L_a$ of carbons determined X-ray diffraction and Raman spectroscopy" *Carbon* 44 (2006) pp. 3239-3246.

Blum, F. "Condition Assessment of Carbon Fiber Composites Using Raman Spectroscopy" *U. MO* (2009) pp. 1-84.

Bylesjö, et al. "OPLS discriminant analysis: Combining the strengths of PLS-DA and SIMCA classification" *J. Chemomet.* 20(8-10) (2006) pp. 341-351.

Everall, N. "Raman spectroscopy in coatings research and analysis: Part II. Practical applications" *JCT Coat. Tech.* 2(20) (2005) pp. 46-52.

Grafen, et al. "Multivariate Characterization of a Continuous Soot Monitoring System Based on Raman Spectroscopy" *Aero. Sci. Techn.* 49 (2015) pp. 997-1008.

* cited by examiner

CARBON FIBER CLASSIFICATION USING RAMAN SPECTROSCOPY

FEDERAL RESEARCH STATEMENT

This invention was made with Government support under Contract No. DE-AC09-08SR22470, awarded by the United States Department of Energy. The Government has certain rights in the invention.

BACKGROUND

Carbon fibers are ubiquitous in manufacturing of high strength polymer composites. Due to their molecular properties (e.g., high molecular alignment), carbon fibers can exhibit excellent stiffness and strength at low weight, as well as high chemical resistance and high thermal tolerance with low thermal expansion. As such, carbon fiber composites have found wide application in a plurality of industries including aerospace and civil engineering, as well as military and first responder, automotive, and in the sports industry.

Accurate analysis of carbon fibers is necessary for identification and characterization purposes of the fibers themselves, as well as for composites incorporating the fibers. Accurate analysis techniques can improve quality control (e.g., assessing specification conformity across lots, designation of fiber categories and sub-categories), quality assurance (e.g., post-production specification conformity), and identification of materials (e.g., counterfeit and forensic analyses), among others. Unfortunately, techniques that are fast in both examination speed and result production, while also able to provide results with high accuracy confidence and at low cost, remain elusive.

There are several analysis techniques available for characterization of carbon fiber, including destructive techniques such as micro-sectioning, stress tests, and fatigue tests, e.g., very high cycle fatigue (VHCF) testing. Non-destructive characterization techniques common to carbon fiber analysis include examination via ultrasonics, X-ray, high frequency eddy current, radio wave testing, and thermography. These testing methods generally report bulk physical characteristics of the materials such as tensile strength, fiber distribution, or impact damage sites through the materials through interrogation of the material at low resolution. Micro-analytical testing methods such as scanning electron microscopy (SEM), energy dispersive spectroscopy (EDS), micro-indentation, and micro-mechanical testing have also been utilized. Unfortunately, such methods generally take a great deal of time and provide limited results. Molecular-level characterization of carbon fibers and carbon fiber composites is commonly carried out by techniques such as Fourier transform infrared spectroscopy (FTIR), Differential scanning calorimetry (DSC), and Raman spectroscopy.

Raman spectroscopy is a highly efficient examination approach as it can utilize low intensity interrogation in a highly effective, non-destructive protocol. Moreover, it is less complicated, more versatile, and lower cost than many other analysis techniques. While Raman spectroscopy has been used to characterize various aspects of individual carbon fibers and carbon fiber composites at the molecular level, it has not found wider application in identification/recognition of fibers or prediction of bulk physical characteristics of carbon fibers.

What is needed in the art are methods and information systems that can advantageously utilize Raman spectroscopy in identification of carbon fibers and prediction of bulk physical characteristics of carbon fibers.

SUMMARY

According to one embodiment, disclosed is a method for identifying a carbon fiber and/or physical characteristics of a carbon fiber by use of data previously gathered from a plurality of reference carbon fibers, e.g., a carbon fiber data library. The data from the reference carbon fibers includes a plurality of principle component analysis (PCA) spaces. Each PCA space (also referred to herein as an N-dimensional space) is related to a single reference fiber and includes at least the first principal component and the second principal component of Raman spectral data of the reference carbon fiber of that PCA space. In addition, the Raman spectral data for each reference fiber includes data that has been collected at least at two different examination conditions, such as at a combination of different wavelengths (at least two wavelengths) or at different fiber orientations (at least two fiber orientations) relative to the polarization direction of the excitation laser, or a combination of conditions.

To identify a carbon fiber of interest, e.g., an unknown fiber, Raman spectral data can be obtained for the examined carbon fiber at the same conditions as was used for the reference fibers. A plurality of parameters can then be extracted from the Raman spectral data of the unknown fiber (e.g., D-band location, G-band location, etc.), and the parameters thus obtained for the examined fiber can then be projected into the PCA spaces of the reference carbon fibers. Following the projection of the data from the unknown fiber into each of the PCA spaces, an identity can be assigned to the examined carbon fiber based upon the results of similarity tests between the projection results.

In another embodiment, the Raman spectral data of a plurality of reference carbon fibers can be utilized to estimate a bulk physical characteristic of a carbon fiber of interest (e.g., tensile properties, flexural properties, thermal properties, etc.). In this embodiment, data previously gathered from a plurality of reference carbon fibers can include a partial least squares (PLS) model of multiple condition Raman spectral data for each of the reference carbon fibers, as well as information regarding the bulk physical characteristics of each of the reference carbon fibers. A method can thus include obtaining the same multiple condition Raman spectral data for the carbon fiber of interest and carrying out a similar PLS model on the data thus obtained from the examined carbon fiber. The PLS model of the examined fiber can then be compared with the PLS models of the reference fibers, and based on the comparison, the physical characteristics of the examined carbon fiber can be estimated with high confidence. This method can be utilized, for instance, when the carbon fiber under examination has been assigned a null identity in an identification protocol (i.e., when the carbon fiber being examined is identified as not corresponding to any of the reference carbon fibers in a carbon fiber data library).

The systems and methods of the present disclosure are directed in one embodiment to a practical application of computing technology. In particular, various specific technical implementations of computerized systems and methods are described herein which can be practically applied to the specific tasks of identification of carbon fibers and prediction of bulk physical characteristics of carbon fibers. Thus, example embodiments of the present disclosure are directed to a particular technological environment and field of technology such as the evaluation of carbon fibers based on Raman spectral data.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
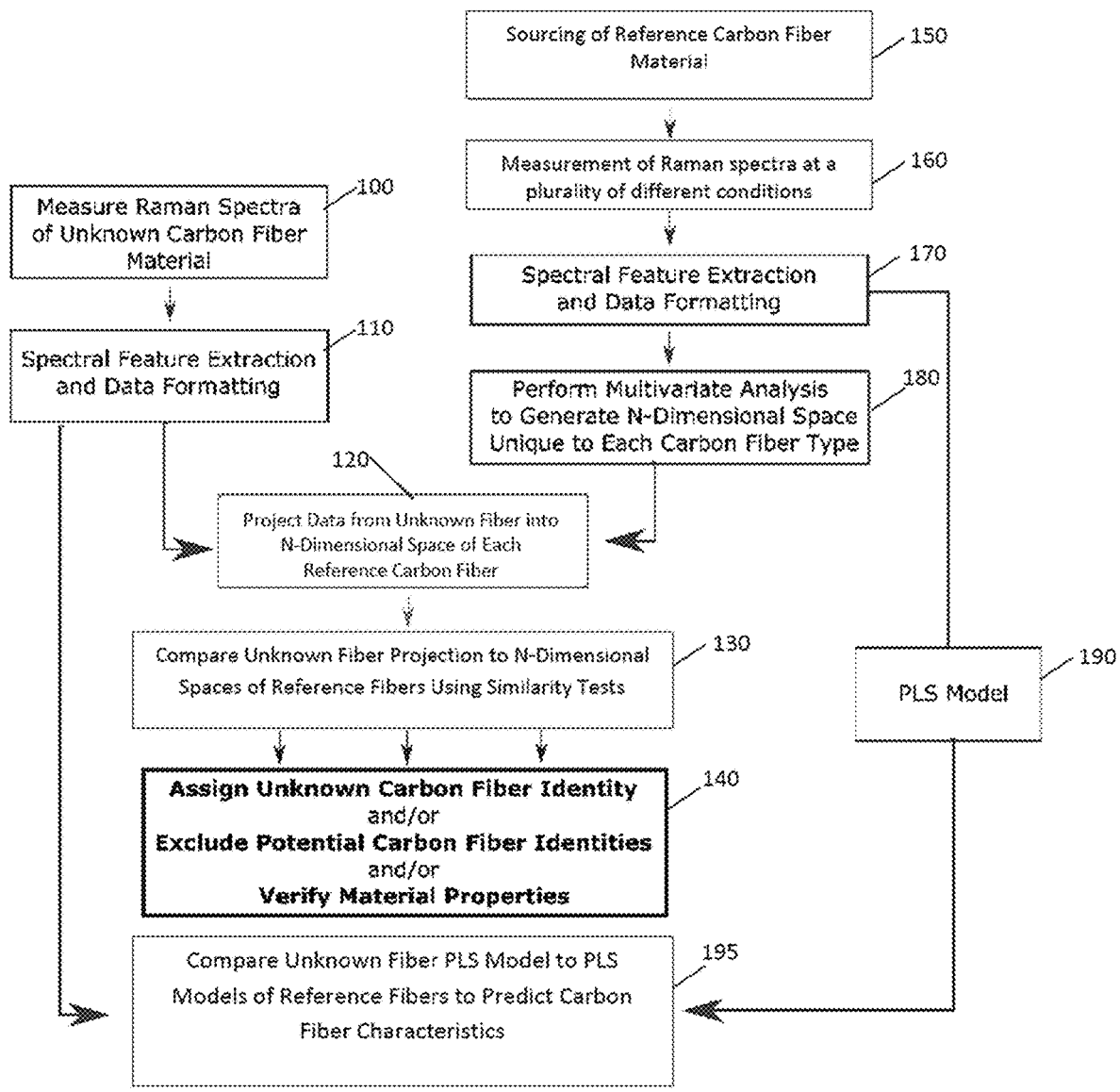
FIG. 1 presents a flow diagram for one method of identification of a carbon fiber and/or carbon fiber characteristics.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, disclosed are carbon fiber characterization processes that include multi-condition Raman spectroscopy-based examination of carbon fibers combined with multivariate data analyses. Disclosed methods can provide a nondestructive material characterization approach that can provide high confidence predictions as to carbon fiber bulk physical properties, as well as identification of unknown carbon fiber materials.

The systems and methods of the present disclosure provide a number of technical effects and benefits. In particular, existing techniques for identifying carbon fibers focus on destructive techniques such as micro-sectioning, stress tests, and fatigue tests, e.g., very high cycle fatigue (VHCF) testing. In contrast, the present disclosure provides a highly effective, non-destructive approach for identifying carbon fibers. Thus, the systems and methods of the present disclosure have a technical effect of permitting carbon fiber identification without destroying the sample to be identified.

As another example technical effect and benefit, the systems and methods of the present disclosure enable low cost prediction of carbon fiber properties. This enables users to understand, for example, the physical properties of a carbon fiber without needing to perform multiple different physical tests, each of which requires the expenditure of time and various resources (e.g., physical testing resources and/or computer resources). Thus, the systems and methods of the present disclosure have a technical effect of enabling understanding of carbon fiber properties while consuming fewer resources.

Disclosed methods can be utilized to characterize or assess carbon fiber so as to provide a wide variety of useful information in multiple applications including, without limitation, quality assurance (QA) metrics; to predict physical properties (i.e. tensile modulus) of an unknown carbon fiber; to predict the identity of an unknown carbon fiber; or to exclude potential identities of an unknown carbon fiber. Beneficially, disclosed methods are nondestructive and can be carried out rapidly. The methods can be particularly beneficial in one embodiment as the methods can be adapted to in situ material characterization; for instance, for on-line monitoring in a manufacturing environment.

Through selection of a number of different conditions used in an initial Raman spectroscopy examination, as well as the framework of the multivariate analysis methods used to analyze the spectral data (e.g., the number of principal components used in a PCA-based identification protocol), a protocol can be designed with a predetermined level of specificity and result confidence. For instance, through utilization of a small number (e.g., 3) of different Raman spectroscopy examination conditions (e.g., two excitation wavelengths and a single fiber orientation, or a single excitation wavelength at two different fiber orientations), as well as a small number of principal components of each of the reference fibers (e.g., only the first and second principal components), an unknown carbon fiber can be identified as a member of a class of similar fiber types (e.g., a turbostratic carbon fiber tow) with a relatively high confidence. Through utilization of a larger number of examination conditions and/or additional principal components of the spectral data of each reference fiber, an unknown fiber can be identified with more specificity, for instance as a particular type of carbon fiber within a class (e.g., a particular carbon fiber from a particular manufacturer). Thus, an identification protocol can be designed to provide the level of specificity and identification confidence desired for a particular application.

Disclosed methods utilize a multi-condition Raman spectral analysis approach for development of reference data, as well as for examination of a carbon fiber of interest. FIG. 1 presents a flow diagram of one embodiment of carbon fiber examination methodology encompassed herein. As can be seen, a method can include measuring Raman spectra of a carbon fiber of interest (e.g., an unknown carbon fiber) 100, extracting spectral features of interest from that data 110, and identifying that fiber through projecting that extracted data into the N-dimensional space of each of a plurality of reference fibers 120, comparison of that projection with each N-dimensional space 130 and through that comparison, identifying some aspect of the carbon fiber of interest 140 through, e.g., specific identification of the carbon fiber, exclusion of an identity of the carbon fiber, and/or verification of the carbon fiber with regard to one or more material properties.

Figure 2:
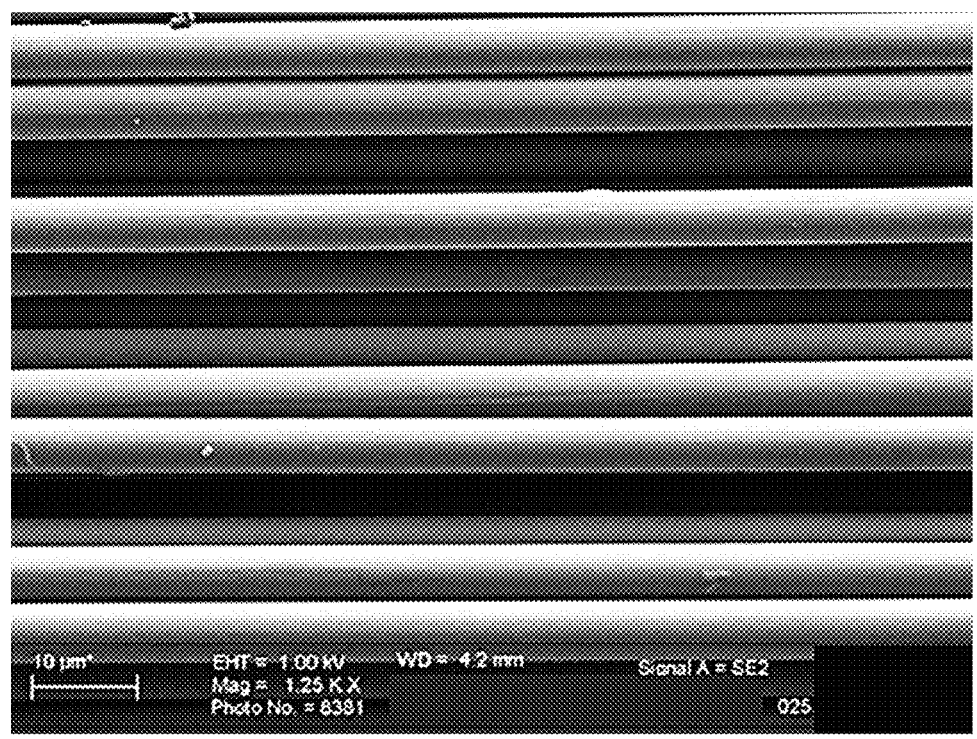
FIG. 2 presents an SEM of a carbon fiber tow as may be examined as described.

Carbon fiber of any precursor source, style, or type may be examined according to disclosed methods. For instance, carbon of a carbon fiber can be turbostratic or graphitic or any combination thereof. By way of example, turbostratic carbon fiber formed from a polyacrylonitrile (PAN) precursor or graphitic carbon fiber formed from a pitch precursor can be identified or utilized as reference materials. Carbon fiber supplied in the form of a continuous tow, as well as individual carbon filaments, is encompassed. For instance, a carbon fiber roving or tow can be examined and the carbon fiber can be straight, twisted, or never twisted. FIG. 2 provides an SEM of a typical carbon fiber tow encompassed herein. A carbon fiber tow can be made up of thousands of individual fibers, for instance from about 1,000 to about 100,000 individual filaments, which themselves typically range in diameter from about 5 to about 15 microns, though any carbon fiber of any number of individual filaments is encompassed. In one embodiment, carbon fiber to be examined as an unknown material or a reference material can have an outer sizing, which can be formed of any sizing material as is known, e.g., polyethylene oxide or polyvinyl alcohol being typical sizing examples. In one embodiment, reference carbon fiber materials can include Raman spectral data from a wide variety of different types, styles, and sizes of carbon fibers, which can increase the likelihood of identifying an unknown carbon fiber with high confidence. In one embodiment, the carbon fiber to be examined can be free of any residual resin or other organic material as may be present in a carbon fiber composite material, as these species can fluoresce when excited by typical Raman laser excitation wavelengths, which can affect results.

As indicated on FIG. 1, a method can also include use, optionally in conjunction with development of a carbon fiber data library, e.g., development of a collection of data regarding a plurality of different carbon fibers for use in identification of an unknown. The sourcing of the reference carbon fiber materials 150 can vary depending generally upon the specific application. For instance, in an application in which the unknown carbon fibers are expected to be one of only a few possibilities, the reference carbon materials to be included in the reference materials can be small. However, large reference material data libraries can also be utilized, as is evident.

The collection of data for the reference materials 160 and in identification of a carbon fiber of interest 100 is carried out by use of Raman spectroscopy. As indicated in FIG. 1, in development of the reference material data, the raw data obtained from each of the reference materials can be processed through extraction of the data of interest 170 followed by multivariate analysis of the extracted data 180, details of which are described further herein.

Figure 3:
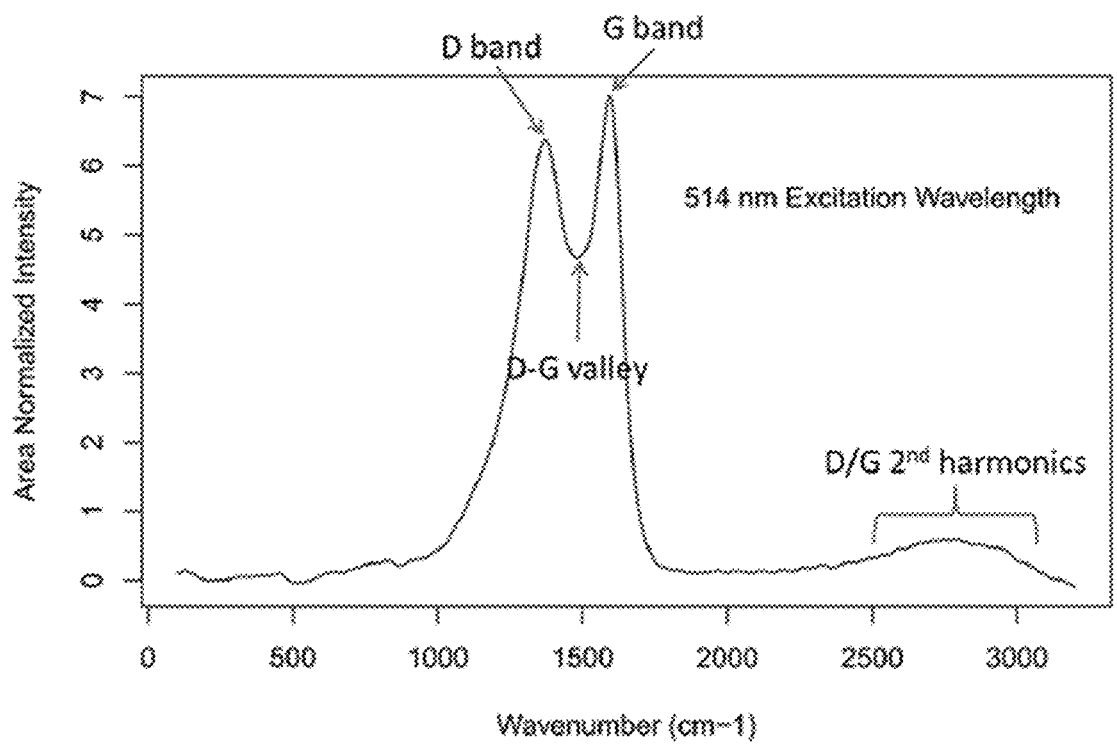
FIG. 3 presents Raman spectra of the fiber of FIG. 2, with notations for various spectral features.

In general, an automated Raman spectrometer with computer controlled optics, sample movement, and data acquisition systems can be used, which can provide higher quality measurements for identification and comparison purposes. Carbon fiber Raman spectroscopy includes focusing an excitation laser (spot size approximately 1-3 microns) on the surface of the fiber and collection of Raman scattered photons. In one embodiment, the excitation laser can be focused in the central region of the fiber diameter and away from the ends of the fiber, to avoid edge effects that can confound the collected data. However, in some embodiments, the collection of Raman spectral data at one or more edges of a fiber can be utilized; for instance, as providing additional conditions for the collected spectral data. FIG. 3 shows a Raman spectra taken with a laser excitation beam focused near the central axis of the fiber of FIG. 2. As shown, the spectra include a prominent D band at 1364 $cm^{-1}$ and a G band at 1594 $cm^{-1}$ with a valley between the two having a minimum at 1482 $cm^{-1}$. The spectra also includes $2^{nd}$ harmonics between approximately 2500-3000 $cm^{-1}$.

Figure 4:
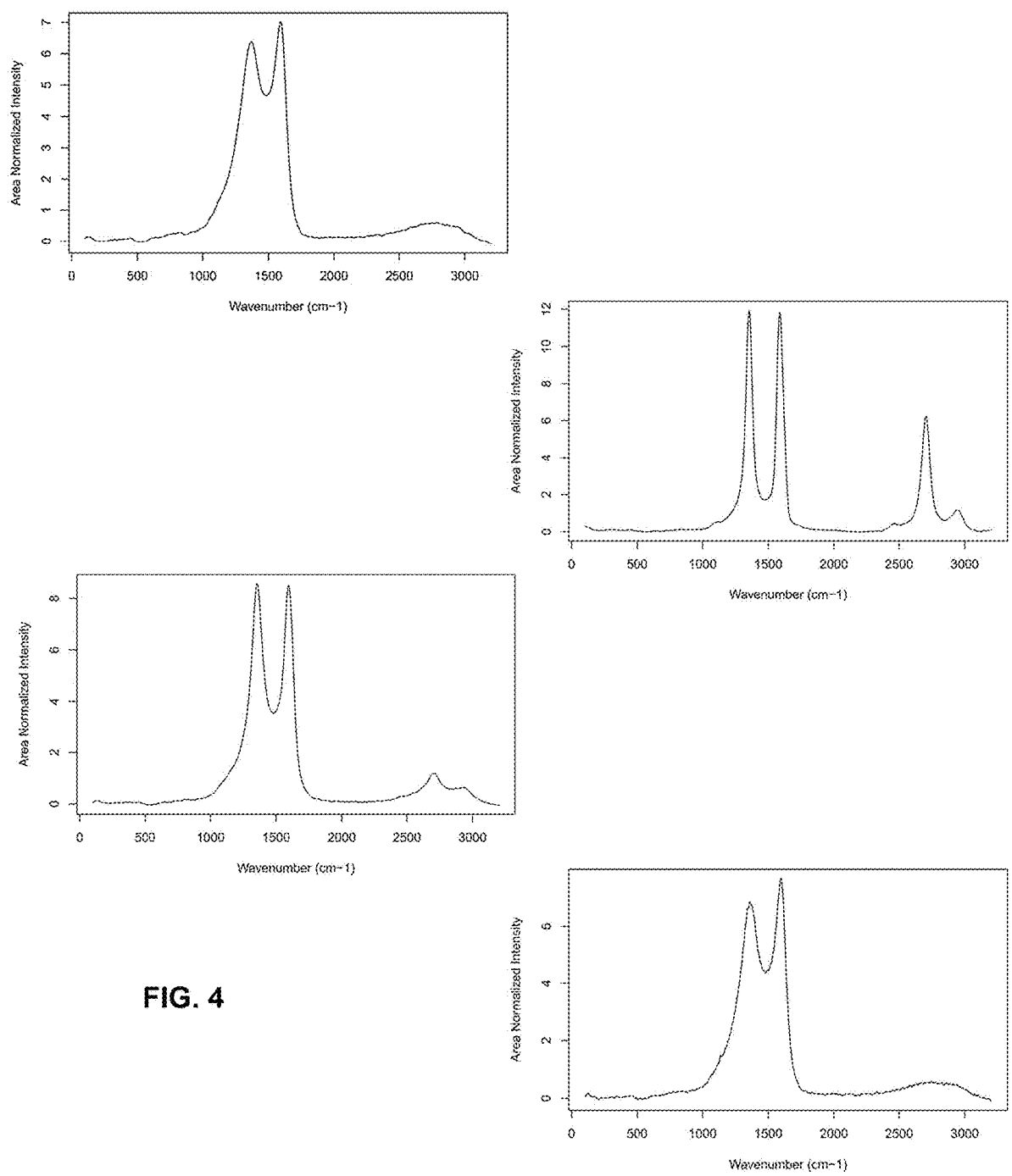
FIG. 4 illustrates Raman spectral data of several different carbon fibers, all taken at the same excitation wavelength and orientation.
Figure 5:
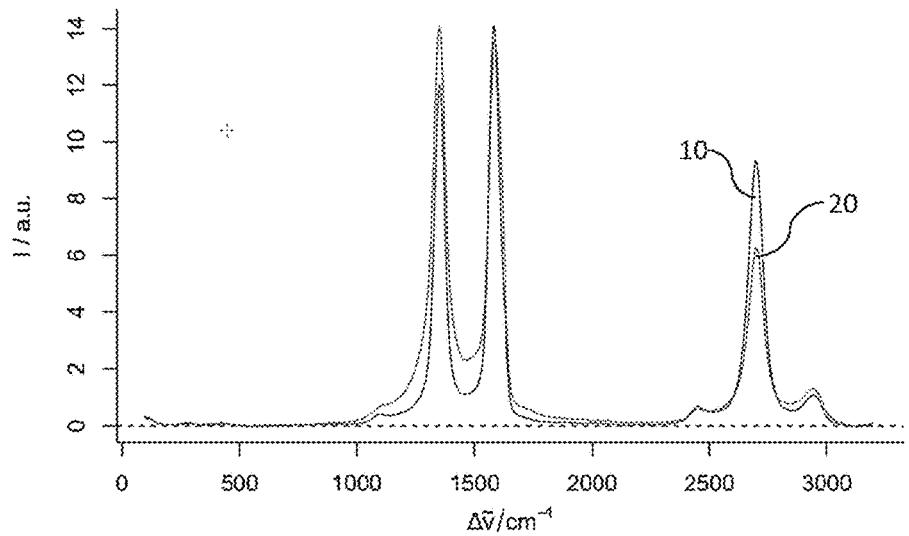
FIG. 5 overlays two Raman spectra of the same fiber taken at identical excitation wavelengths and at different orientations to the excitation laser.

The Raman spectra band structure is a function of the chemical and structural physics of a carbon fiber and distinct differences can be observed between different classes of material. For instance, FIG. 4 presents the Raman spectra of four different carbon fibers. The Raman spectra for all of the fibers were taken at the same excitation wavelength, with the excitation focused at/near the central axis of the fibers and away from the fiber ends, and with the fiber axes at the same orientation with reference to the excitation laser. As can be seen, all of the fibers exhibit a different Raman spectra. The present identification protocol has been developed through advantageously recognizing and utilizing the knowledge that not only do different carbon fibers exhibit different Raman spectra, but also that the Raman spectra of a single fiber can vary depending upon the conditions of the spectroscopic examination, and this variation will be different for different fibers. For instance, as shown in FIG. 5, the Raman spectra of a single carbon fiber is shown in which a first spectra 10 was obtained with the fiber axis oriented parallel to the polarization direction of the laser excitation, and a second spectra 20 was obtained with the same fiber at the same excitation wavelength, but the fiber axis oriented perpendicular to the polarization direction of the laser excitation. Disclosed analysis techniques utilize such differences to identify carbon fibers as well as to estimate macroscopic physical characteristics of carbon fibers.

In examining a carbon fiber, either as a reference carbon fiber or in an identification protocol, the Raman spectroscopy examination can be carried out at multiple conditions, i.e., at least two different conditions. In general, the different conditions used to examine a fiber can include a combination of least two different excitation wavelengths or at least two different fiber orientations with reference to the polarization direction of the excitation laser. For instance, Raman spectral data can be gathered from a single fiber at two different excitation wavelengths, with both protocols, including the fiber axis, aligned at the same angle to the excitation laser polarization (e.g., either perpendicular or parallel). In another embodiment, Raman spectral data can be gathered from a single fiber at a single excitation wavelength but at two different orientations of the fiber axis to the excitation laser polarization. Any combination of excitation wavelengths and/or fiber axis orientations can be used and it should be understood that while much of this discussion concerns spectral data gathered at 514 nm and/or 785 nm excitation lasers and with the fiber axis either parallel or perpendicular to the polarization direction of the excitation laser, these are simply non-limiting embodiments of the disclosed methods and any suitable excitation wavelength and fiber axis orientation is encompassed herein. For instance, Raman spectral data can be gathered at one or multiple different excitation wavelengths (e.g., any wavelength between about 200 nm and about 1200 nm) and at one or multiple orientations angles from parallel (0°) to perpendicular (90°) and to complete polarization) (180°) of the fiber axis with the excitation laser polarization direction. Other examples of conditions that can be modified in the Raman spectral data collection can include, without limitation, location of the laser focus on the fiber diameter (e.g., either at the axis, at a distance from the axis, at the fiber edge), location of the laser focus on the fiber length (e.g., at an end, away from an end), laser excitation power (e.g., powers ranging from about 0.1 mW to 20 mW below the damage threshold of the fiber), etc.

For instance, laser irradiation focus spot location can affect the Raman measurements as Raman data collected at the end of a fiber is different from that collected well away from the end of the fiber (e.g., about 5 µM or more). Conditions utilized in data collection, however, should be such that high fidelity data can be collected. For instance, instrument stability is important for collection of quality data, and long duration spectral collection may result in the excitation region drifting off fiber. Undesirable conditions can result in reduced signal-to-noise ratio and data quality. Raman spectra features are relatively insensitive to laser excitation power assuming no thermal degradation occurs. For instance, data extracted from spectra collected at 2 mW and 20 mW with a 514 nm excitation laser source can be indistinguishable, although the signal-to-noise ratio at a higher power collection conditions can provide better data quality.

Figure 6:
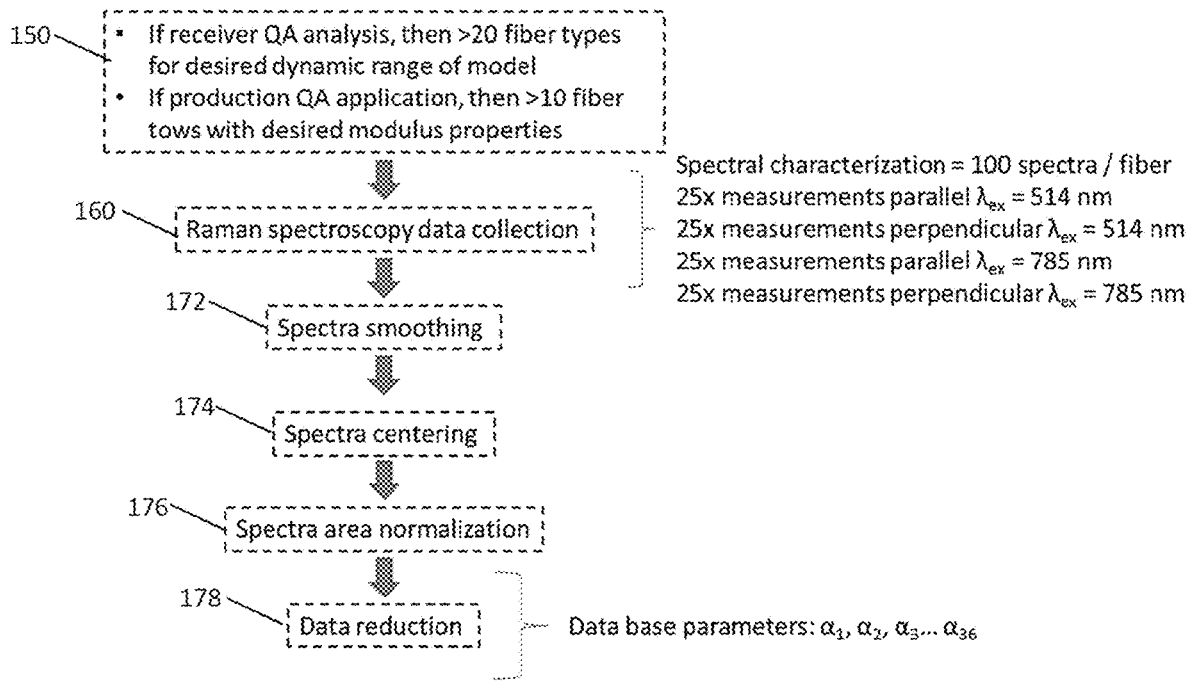
FIG. 6 presents a flow diagram for one method of obtaining and adjusting Raman spectral data for a carbon fiber according to disclosed methods.

FIG. 6 presents a typical flow diagram as can be used in obtaining reference data for use in an examination protocol. As mentioned above with regard to FIG. 1, the number of reference fibers sourced as the reference materials 150 to be examined in developing the reference data can vary, with a high number of reference fibers allowing for a wider data pool for identification of more and different types of unknown fibers. For instance, an identification protocol can, in one embodiment, be carried out with reference to data from only a few reference fibers, e.g., about 5 fibers or about 10 fibers, in those embodiments in which a generic classification of an unknown fiber as to type is the desired result or in an embodiment in which the fibers to be examined are from a limited number of possible sources. Including data from a larger number of reference fibers, e.g., about 15 fibers or more, about 20 fibers or more, about 30 fibers or more, etc. can provide for high specificity in identification of an unknown fiber.

In the illustrated embodiment of FIG. 6, two different options are described with regard to numbers of the reference carbon fiber material 150. In one embodiment, at least 10 fibers are examined as reference fibers e.g., from about 10 to about 20 fibers. Such an embodiment can be one in which an identification process is to be used in a production quality assurance (QA) application; for instance, in which examination of carbon fiber on a production line is carried out in order to confirm that the carbon fiber meets targeted specifications (e.g., modulus properties). Another embodiment can utilize a higher number of reference fibers; for instance, about 20 fibers or more. Such an embodiment may encompass a receiver QA analysis in which the identification of an unknown fiber type is the goal, for instance in a counterfeit recognition protocol, in which case, additional reference data can improve results.

As shown, spectral characterization of a fiber can include data collection for each reference fiber by use of Raman spectroscopy at multiple conditions 160. In this particular embodiment, a combination of four different conditions is described, a first and second excitation wavelength (514 nm and 785 nm) and a first and second fiber axis alignment orientation (parallel to the excitation laser polarization direction and perpendicular to the excitation laser polarization direction). Multiple measurements of each fiber can also be taken in order to collect a representative aggregate spectrum. In this particular embodiment, a data collection process can include 25 measurements of the fiber at each combination of the different conditions, leading to the collection of 100 different spectral measurements of each reference fiber. Of course, fewer or more measurements can be taken at each condition, though in general it can be beneficial to take at least two measurements at each designation.

As is known, each spectrum can be defined by a plurality of different variables, generally including at least the D band location, the G band location, and the valley location between the two. However, additional variables can also be utilized to define each spectrum. For instance, in one embodiment, each spectrum can be defined by 9 different variables including D band location, G band location, valley location, D-band intensity, G-band intensity, valley intensity, D/G intensity ratio, DN intensity ratio, and GN intensity ratio. In addition, each variable can be obtained for each condition set, e.g., for each combination of excitation wavelength and each fiber orientation. Thus, in the example of FIG. 6, in which Raman spectra is obtained at four different conditions, a total of 36 parameters can be determined for each examined fiber (9 variables×4 conditions).

Following collection of the raw data, the raw data can be subjected to various processes and the spectral parameters of interest can be extracted from the data. For instance, a step-wise data processing method can be carried out to clean up raw spectral data via, e.g., spectra smoothing and background subtraction/correction, and to extract the desired identification data from different regions of the carbon fiber spectra. For instance, an automated data analysis method can include spectra smoothing 172, spectra centering 174, baseline correction, area-normalization, and spectral feature detection can be used for rapid characterization. Spectra can be modified with smoothing, spectra area normalization 176 functions, and data reduction 178 that can be utilized to extract the parameters of interest. By way of example, Table 1, below, provides a description of all 36 parameters for the particular embodiment illustrated in FIG. 1.

TABLE 1

| Parameter ID | Spectra Feature | Laser excitation | Polarization | Descriptor Units |
|---|---|---|---|---|
| $\alpha_1$ | D band max | 514 nm | 0° | Wavenumber |
| $\alpha_2$ | D band max | 514 nm | 0° | Relative Intensity |
| $\alpha_3$ | D band max | 514 nm | 90° | Wavenumber |
| $\alpha_4$ | D band max | 514 nm | 90° | Relative Intensity |
| $\alpha_5$ | D band max | 785 nm | 0° | Wavenumber |
| $\alpha_6$ | D band max | 785 nm | 0° | Relative Intensity |
| $\alpha_7$ | D band max | 785 nm | 90° | Wavenumber |
| $\alpha_8$ | D band max | 785 nm | 90° | Relative Intensity |
| $\alpha_9$ | G band max | 514 nm | 0° | Wavenumber |
| $\alpha_{10}$ | G band max | 514 nm | 0° | Relative Intensity |
| $\alpha_{11}$ | G band max | 514 nm | 90° | Wavenumber |
| $\alpha_{12}$ | G band max | 514 nm | 90° | Relative Intensity |
| $\alpha_{13}$ | G band max | 785 nm | 0° | Wavenumber |
| $\alpha_{14}$ | G band max | 785 nm | 0° | Relative Intensity |
| $\alpha_{15}$ | G band max | 785 nm | 90° | Wavenumber |
| $\alpha_{16}$ | G band max | 785 nm | 90° | Relative Intensity |
| $\alpha_{17}$ | D-G valley min | 514 nm | 0° | Wavenumber |
| $\alpha_{18}$ | D-G valley min | 514 nm | 0° | Relative Intensity |
| $\alpha_{19}$ | D-G valley min | 514 nm | 90° | Wavenumber |
| $\alpha_{20}$ | D-G valley min | 514 nm | 90° | Relative Intensity |
| $\alpha_{21}$ | D-G valley min | 785 nm | 0° | Wavenumber |
| $\alpha_{22}$ | D-G valley min | 785 nm | 0° | Relative Intensity |
| $\alpha_{23}$ | D-G valley min | 785 nm | 90° | Wavenumber |
| $\alpha_{24}$ | D-G valley min | 785 nm | 90° | Relative Intensity |
| $\alpha_{25}$ | $\alpha_2/\alpha_{10}$ | 514 nm | 0° | Int. ratio (D/G) |
| $\alpha_{26}$ | $\alpha_4/\alpha_{12}$ | 514 nm | 90° | Int. ratio (D/G) |
| $\alpha_{27}$ | $\alpha_6/\alpha_{14}$ | 785 nm | 0° | Int. ratio (D/G) |
| $\alpha_{28}$ | $\alpha_8/\alpha_{16}$ | 785 nm | 90° | Int. ratio (D/G) |
| $\alpha_{29}$ | $\alpha_2/\alpha_{18}$ | 514 nm | 0° | Int. ratio (D/V) |
| $\alpha_{30}$ | $\alpha_4/\alpha_{20}$ | 514 nm | 90° | Int. ratio (D/V) |
| $\alpha_{31}$ | $\alpha_6/\alpha_{22}$ | 785 nm | 0° | Int. ratio (D/V) |
| $\alpha_{32}$ | $\alpha_8/\alpha_{24}$ | 785 nm | 90° | Int. ratio (D/V) |
| $\alpha_{33}$ | $\alpha_{10}/\alpha_{15}$ | 514 nm | 0° | Int. ratio (G/V) |
| $\alpha_{34}$ | $\alpha_{12}/\alpha_{20}$ | 514 nm | 90° | Int. ratio (G/V) |
| $\alpha_{35}$ | $\alpha_{14}/\alpha_{22}$ | 785 nm | 0° | Int. ratio (G/V) |
| $\alpha_{36}$ | $\alpha_{16}/\alpha_{24}$ | 785 nm | 90° | Int. ratio (G/V) |

Other base parameters can likewise be included in a data set for an individual fiber. For example, in one embodiment, whole spectral fitting can be included. In another exemplary embodiment, the target spectral regions noted can include information contained in the D/G harmonic regions.

As indicated in the embodiment illustrated in FIG. 6, the combination of two laser excitation wavelengths, two polarization orientations, and 25 separate Raman spectra measurements at each conditions leads to 100 separate spectral measurements for a single fiber specimen. Without wishing to be bound to any particular theory, it is believed that the breadth and fidelity of spectral data available can drastically increase with additional conditions included in an examination such as additional excitation laser sources (e.g. 325, 425, 1056 nm, etc.), optionally with additional orientations, as well as other additional conditions as discussed previously.

Figure 7:
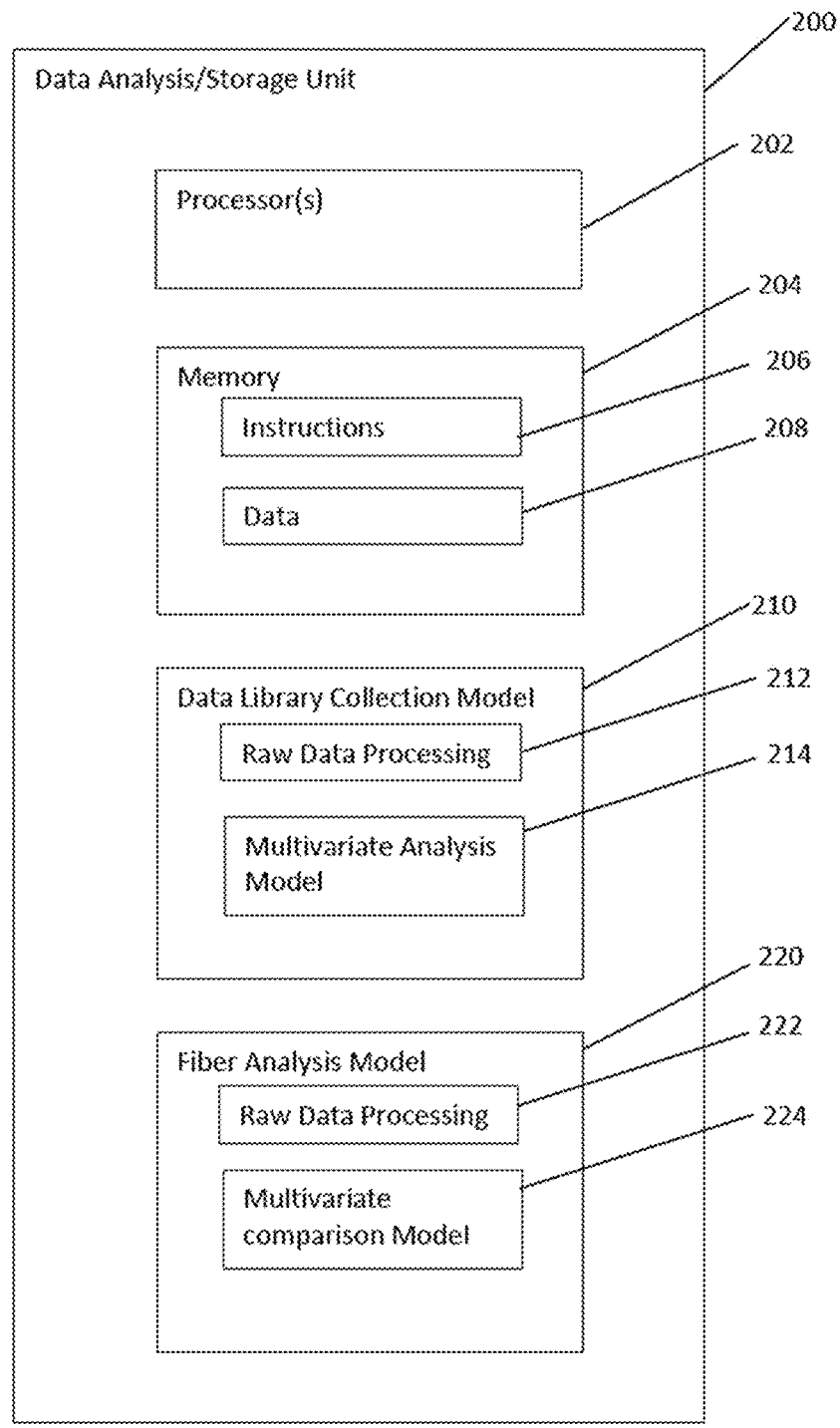
FIG. 7 illustrates an exemplary system for carrying out data manipulation and storage aspects of disclosed methods.

In general, the data processing, analysis, storage, etc. can be carried out by use of a computer system. FIG. 7 depicts an exemplary analysis unit 200 according to an exemplary embodiment of the present disclosure. Data analysis/storage unit 200 can be used in any carbon fiber examination process, including, for example, a system as illustrated in FIG. 1. Moreover, methods as disclosed herein are not limited to use of only a single data analysis unit. For instance, in one embodiment, a first data analysis unit can be utilized in development of carbon fiber reference materials, and a second, separate unit can be utilized in examination of an unknown carbon fiber.

A data analysis/storage unit 200 can include one or more processors 202 and a memory 204. The processor(s) 202 can be any suitable processing device, such as a microprocessor, microcontroller, integrated circuit, or other suitable processing device, including a combination of discrete analog and/or digital logic circuitry (such as switches, amplifiers, integrators, comparators, flip-flops, AND gates, and the like) to perform control functionality.

The memory 204 can include any suitable computing system or media, including, but not limited to, non-transitory computer-readable media, RAM, ROM, hard drives, flash drives, or other memory devices. The memory 204 can store information accessible by processor(s) 202, including instructions 206 that can be executed by processor(s) 202. The instructions 206 can be any set of instructions that when executed by the processor(s) 202, cause the processor(s) 202 to provide desired functionality. For example, instructions 206 can include instructions for performing the methods of FIG. 6 and/or the methods of FIG. 1. Memory 204 can further store data 208. Data 208 can be any form of data, including reference data, for use in a carbon fiber identification protocol that can be stored for later transmission or utilization.

For example, in one embodiment, a data analysis/storage unit 200 can include a data library collection model 210 that can be utilized to process raw spectral data of a plurality of reference fibers 212, one embodiment of which is illustrated in FIG. 6, and can also be utilized to carry out one or more multivariate analysis models 214 on the extracted reference data, examples of which are further described herein.

A data analysis/storage unit 200 can, in one embodiment, also include a fiber analysis model 220 that can be utilized to process raw spectral data of a fiber of interest 222 and can also be utilized to carry out one or more multivariate comparison models 224 on the extracted comparison fiber data, examples of which are further described herein. Of course, as previously stated, multiple different units can be utilized in various aspects of disclosed methods. For instance, a first unit can include a data library collection model, while a second unit can include a fiber analysis model, in which case the second unit can include information regarding the reference data in the memory of the unit.

Following collection and extraction of the desired data from the reference fibers, the extracted data can be analyzed according to a multivariate analysis model. In one embodiment, the multivariate analysis model can include PCA, and this analysis can be used to provide reference data for use in an identification protocol. Utilization of principal component analysis allows for an identification method that can significantly reduce the number of parameters that are required to accurately identify an unknown carbon fiber.

PCA is a mathematical procedure that utilizes an orthogonal transformation to convert a set of observations of possibly correlated variables, such as the set of vectors representative of a plurality of parameters that identify a particular carbon fiber, to a set of values of linearly uncorrelated variables termed principal components. The number of principal components is less than or equal to the number of original variables. The transformation is defined so that the first principal component has the largest possible variance and each succeeding component has, in turn, the highest variance possible under the constraint that it be orthogonal to, that is, uncorrelated with, the preceding components.

According to one embodiment of the disclosed methods, a PCA may be performed on vectors representative of a plurality of parameters of selected carbon fiber variables for each reference carbon fiber. For example, the feature space may include vector representations of D-band at a first wavelength, D-band at a second wavelength, G-band at a first wavelength, G-band at a second wavelength, etc. In this embodiment, a computing device, such as a device 200 illustrated in FIG. 7, may be configured to transform the vector representations of all of these parameters to a smaller dimensionality set of constituent features describing the greatest variation in the underlying data, i.e., a first principal component, a second principal component, etc. The analysis can thus provide a plurality of PCA spaces, each of which representing one of the reference fibers. The PCA space describing each reference fiber can then be utilized in a comparison analysis with an unknown fiber. Through utilization of a multivariate analysis method such as PCA, the comparison analysis used to identify an unknown fiber can be much more straight forward as would be an analysis that utilized the underlying data of the reference fibers, and can still provide high confidence identification results.

Figure 8:
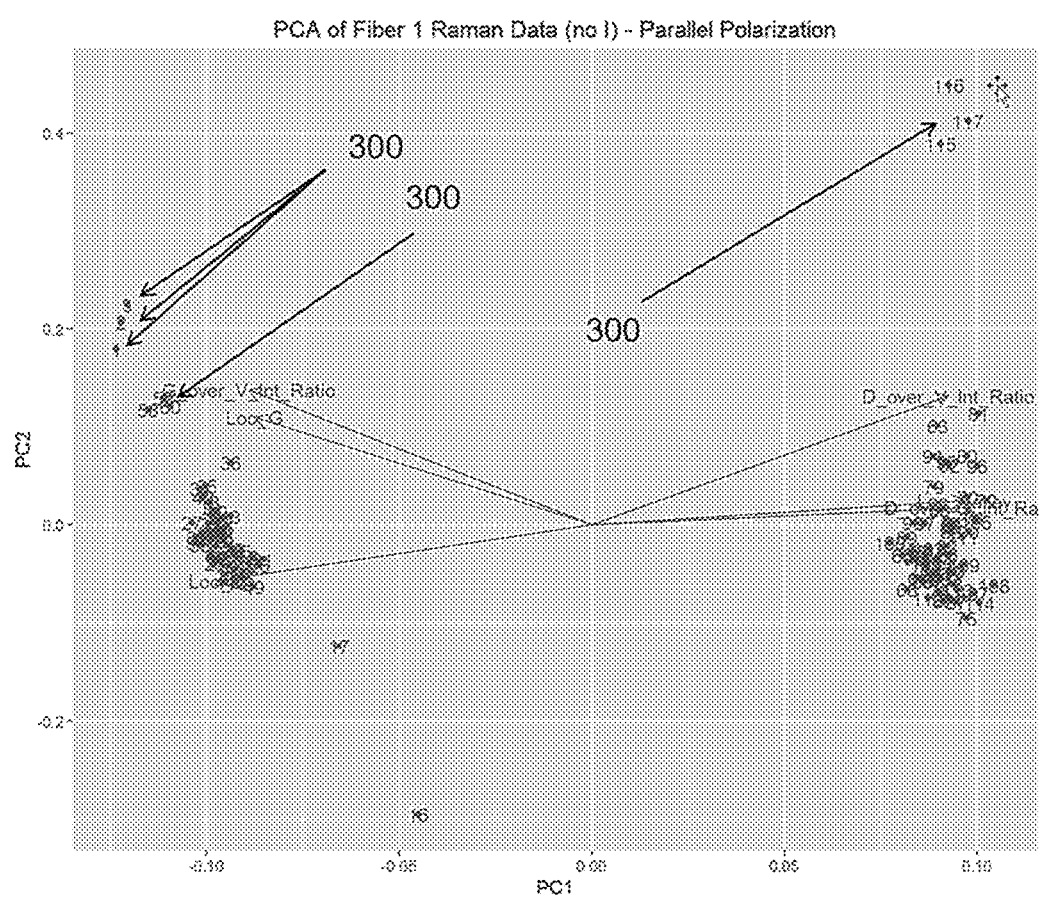
FIG. 8 presents a plot of the first and second principal components of data from a single reference fiber obtained at two excitation wavelengths and a single orientation, including data taken at several locations on the fiber.

More specifically, PCA of the extracted data for each reference fiber can be used to create coordinate transformations that can describe measurement variability associated with different fibers and different fiber types. For instance, FIG. 8 presents a two principal component plot for a typical carbon fiber including data from two different laser excitation wavelengths. Data obtained at a first wavelength is clustered on the left side of the plot, while data obtained at a second wavelength is clustered on the right side of the plot. In addition, in this particular example, Raman spectral data was also obtained with the excitation laser focused at the fiber ends at each of the excitation wavelengths. When plotted, this data 300 generally falls outside of the clustered data from the other measurements, as shown. As such, in some embodiments, Raman spectral data from the fiber ends may not be a condition of choice for reference or identification purposes. In any case, even the two principal component plot of the multi-condition Raman spectral data of a single fiber, as shown in FIG. 8, can provide suitable variability to that of other fibers examined at the same conditions so as to provide a route for identification of unknown fibers by use of the PCA reference data.

Figure 9:
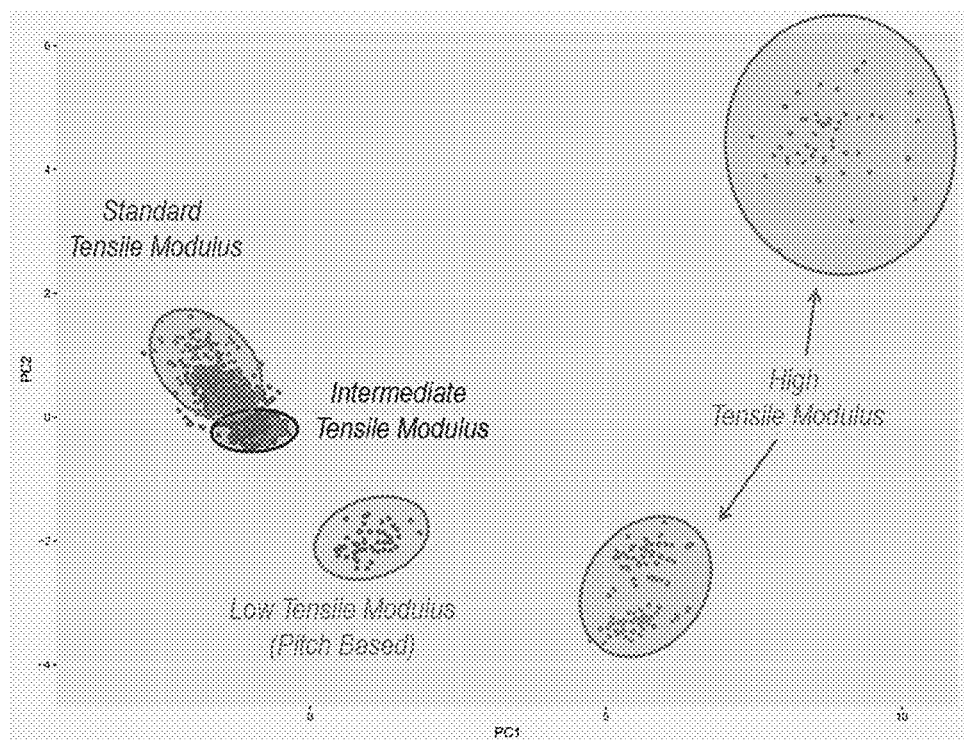
FIG. 9 presents a two principal component plot for several different reference fibers showing the groupings of the different reference fibers on the plots according to various bulk characteristics as indicated.

For instance, and as illustrated in FIG. 9, overlaid plots of first and second principal components of the multi-condition Raman spectral data of a plurality of different carbon fibers clearly shows clustering of fibers by material properties. As such, by carrying out the same multi-condition Raman spectral examination and data modification as was carried out for the reference fibers, and then projecting the data thus obtained for the examined fiber into the principal component space of each reference fiber in turn, analysis and comparison of the projections can be used to identify the fiber, either by identification of the fiber as a member of a larger class of fibers with regard to a physical characteristic (e.g., falling into one of the tensile modulus classes including intermediate tensile modulus low tensile modulus, high tensile modulus, or standard tensile modulus as indicated in FIG. 9), or a larger class of fibers with regard to some other fiber type (e.g., falling into a cluster of twisted, high filament fibers), by identification of the particular fiber (e.g., a particular carbon fiber type sold by a particular manufacturer), or according to any other identification criteria.

Upon development of the reference data, and upon carrying out a multivariate analysis of the reference data so as to define an N-dimensional space for each reference fiber, the data library thus obtained can be utilized to identify an unknown fiber in an identification protocol, as indicated in FIG. 1. In an identification protocol, the spectral data acquisition 100 and data extraction 110 can be performed in an identical fashion for the carbon fiber of interest as was carried out for the reference carbon fibers. The results of the data collection process for an unknown fiber can thus include a multiple parameter data set for the examined fiber, similar to that described in Table 1 above for a reference fiber.

Figure 10:
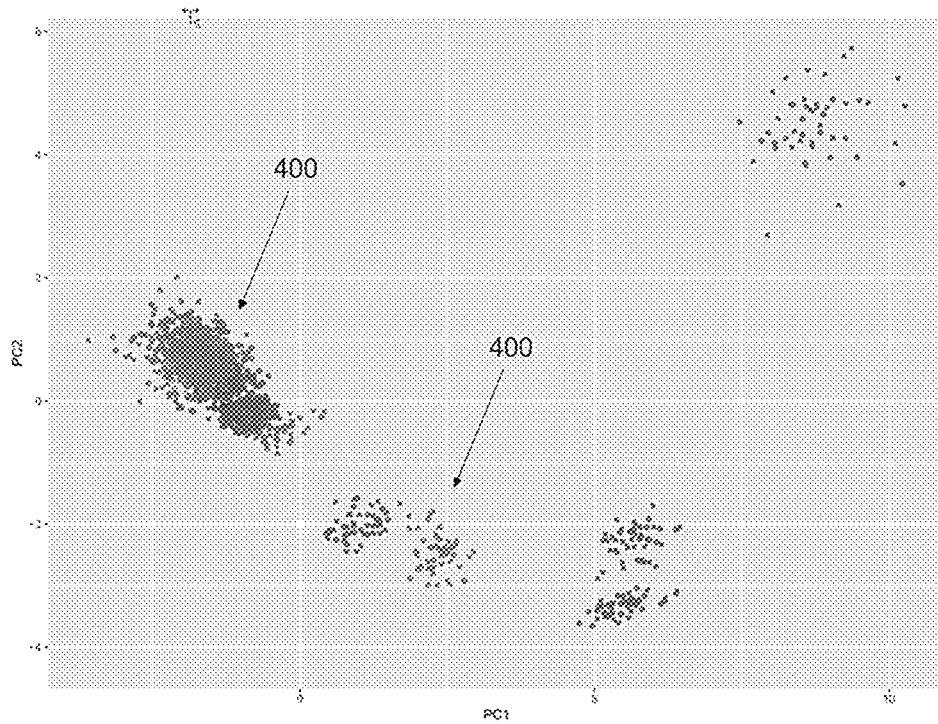
FIG. 10 presents the two principal component plot of FIG. 8, with the addition on the plot of the projections into the PCA spaces of data from unknown fibers.

As illustrated in FIG. 1, following collection and data extraction, data of the examined fiber can be projected into the PCA space of one or more reference fibers. For instance, FIG. 10 illustrates the two-principal component plot of FIG. 9, including information regarding multiple different reference fibers, with the addition of the projection of data from unknown fibers 400 overlaid on the plot. As can be seen, the projected data identifies the unknown fibers more closely with some of the referenced fibers than with others. Projection of the data of the unknown carbon fiber into each previously developed PCA space can be carried out according to known mathematical techniques by performing the transformations of each of the developed PCA spaces on the vectors representative of the plurality of parameters of the selected carbon fiber variables for the unknown carbon fiber.

Upon the projection of the unknown carbon fiber data into each PCA space of the reference data library, identification of the unknown fiber can be obtained through the utilization of any suitable statistical analysis approach that can compare the projection of the unknown fiber data with the PCA space of each reference fiber to which it is compared and identify the closest matching comparisons. For instance, a multidimensional similarity test such as a soft independent modelling by class analogy (SIMCA) approach (see, e.g., K. Lavine, Barry. (2006). Clustering and Classification of Analytical Data. Chapter in Encyclopedia of Analytical Chemistry). Statistical analysis methods such as SIMCA can be utilized in carbon fiber identification as well as for reference and confidence metric generation, as is known. Other statistical analysis methods as are known in the art can be utilized, either in addition to or alternative to a SIMCA approach such as, and without limitation to, partial least squares discriminant analysis, self-organizing map, utilization of distance metrics such as L2 norms, and support vector machine analysis methods, as well as combinations of analysis methods. In addition, it should be understood that identification protocols can be utilized not only to assign a likely identity to an unknown carbon fiber, but can also be utilized to rule out potential identities, for instance in a counterfeit recognition application.

In one embodiment, an unknown fiber can be assigned the identity of the comparison fiber (or the comparison fiber class) if its Mahalanobis distance of comparison falls within the 95% confidence interval or higher, e.g., the 98% confidence interval, or the 99% confidence interval in some embodiments.

Depending upon the classification model used, as well as the number of principal components used in a comparison protocol, a single unknown fiber can have one or multiple matches to a reference data base. Depending upon the specific outcome desired and application, as well as the particular reference fibers, this can be acceptable results in some embodiments. For instance, if a plurality of the reference fibers fall into a single class (e.g., high tensile modulus fibers) and the examined fiber is identified as matching several of these fibers with a high confidence interval, this result may be suitable if the desired outcome is to confirm that the examined fiber is, in fact, a high tensile modulus fiber. If, however, the desired outcome is for a more particular identification, the classification model can be modified so as to provide the desired outcome with a high confidence level.

Figure 11:
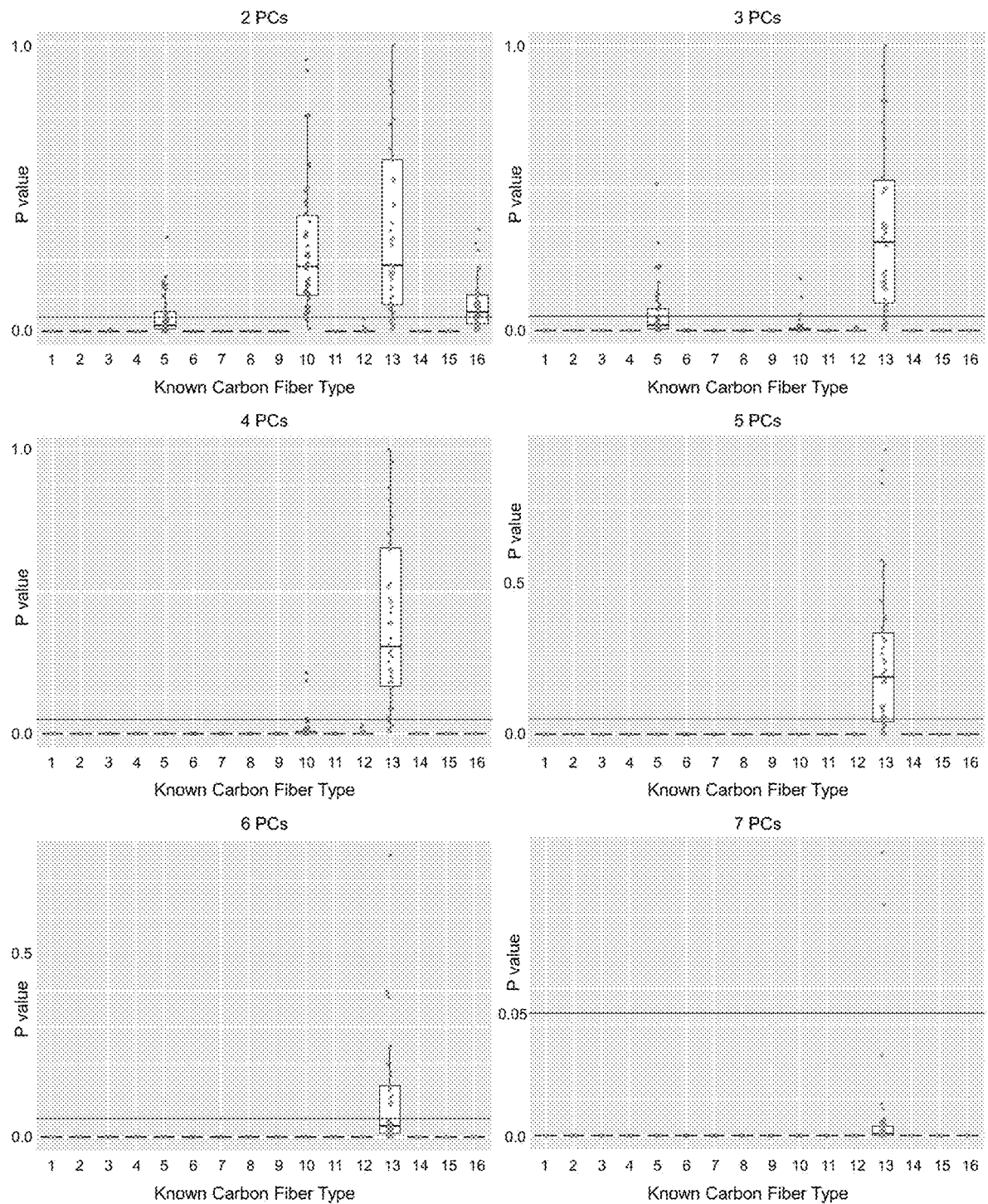
FIG. 11 presents p-value plots for an unknown carbon fiber following projection of the Raman spectral data of the unknown fiber into the PCA spaces of 16 different reference carbon fibers, each plot shows the data projection results using increasing numbers of principal components in the analysis.

For instance, through modification of the classification model to include additional principal components in the PCA space for each reference fiber, and thus additional operators in the projection of the data from the unknown fiber into each PCA space, a higher correlation between the unknown fiber and a single reference fiber can be obtained. By way of example, FIG. 11 illustrates p-value plots for an unknown fiber upon projection of the Raman spectral data from the unknown fiber into the PCA spaces of 16 different reference fibers. Each successive plot of FIG. 11 includes the data from the analysis utilizing increasing numbers of principal components of the reference data, with the solid line across each plot indicating a p-value of 0.05. For instance, the top left p-value plot shows the results of the projection of the unknown fiber data into PCA spaces of the reference fibers using only two principal components. As shown, the unknown fiber in this instance can be identified with four of the unknown fibers. Upon increasing the number of principal components utilized in the analysis to 3, the same unknown fiber can be identified with two of the unknown fibers, and so on with higher and higher confidence level to the plot shown at the lower right of FIG. 11, in which the analysis was carried out with the first seven principal components of the reference fiber data. As shown, the unknown fiber in this instance can be identified with extremely high confidence as identical to the known carbon fiber type number 13.

In addition to identification of carbon fibers via PCA, multi-condition Raman spectral data obtained as described herein can be utilized to generate a predictive model that can be used to correlate the Raman spectral data of a fiber to material properties, such as, without limitation, tensile characteristics (e.g., tensile modulus, tensile strength, elongation), flexural properties (e.g., bend strength), or thermal characteristics (e.g., specific heat, thermal diffusivity, thermal conductivity), via mathematical models such as partial least squares (PLS) methods. For instance, as illustrated in FIG. 1, the extracted parameters obtained from the spectral data of each reference fiber can be applied in a PLS model 190. Upon carrying out the same PLS model on the extracted parameters obtained from the spectral data of an unknown fiber, a comparison between the results can be utilized to predict carbon fiber characteristics of the unknown fiber.

A PLS method can provide for prediction of carbon fiber physical properties in one embodiment as a complementary methodology to the data derived from a PCA-based identification model. For example, if, following the carrying out of an identification protocol as described above, an unknown carbon fiber species yielded zero database matches (i.e., the fiber is assigned a null identity following the comparison), a PLS-based method can be used to predict one or more physical characteristics of the unknown fiber, which can be used for, e.g., general fiber classification of the unknown fiber.

Figure 12:
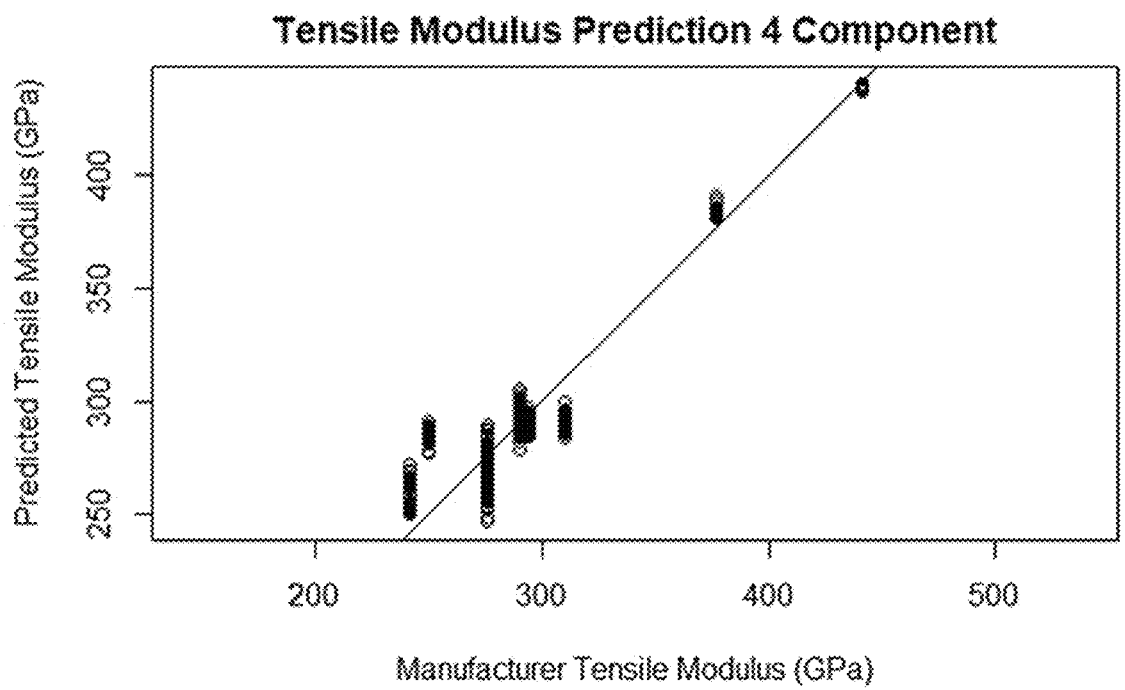
FIG. 12 presents results of a 4-component partial least squares (PLS) model plot of predicted tensile moduli for several different fibers as determined by the methods as described herein against the manufacturer reported tensile moduli for those fibers.

By way of example, FIG. 12 illustrates the results of a PLS model as described herein. To develop the results, Raman spectral data as described above was obtained for a series of different carbon fibers (i.e., at a combination of two excitation wavelengths and two fiber orientations, with 25 measurements taken at each condition, yielding 36 different parameters). A PLS analysis was then carried out on the data thus obtained. To carry out a PLS analysis, the database data set input text file can include additional information concerning macroscopic characteristics of the reference fibers. For instance, the data can include characteristics such as tensile modulus value (e.g., in GPa), modulus type (e.g., low, standard, intermediate, high, and ultra-high elastic modulus), if the fiber type is PAN or Pitch, and if the fiber is part of the database as a known fiber or an unknown fiber. This input information could be generated explicitly for the PLS analysis model, or alternatively, can be simply sourced from publicly available reference values (e.g., fiber vendor specification metrics, technical publications on carbon fiber properties, and/or other industry data sets).

In one embodiment, the tensile modulus value can be used for the PLS analysis while the modulus type and fiber types (PAN vs Pitch, known vs unknown) can be used to separate data types. In one embodiment, the pls package available for R can be used for the PLS analysis. In this embodiment, the database data set and the unknown fiber data set are inputs into the plsr function in the pls package in R.

Cross-validation can be used to determine the optimal number of components for the software to consider. In one embodiment, the leave-one-out cross-validation method can be used. A cross-validation can be used to select the number of components for the analysis, and typically, this is selected when the cross-validation error does not significantly decrease further with increasing number of components.

The validation results from the analysis are the root mean squared error of prediction (RMSEP) and indicates how many components should be used to reduce the error. FIG. 12 was generated by taking into account four (4) components for the PLS analysis, where the error was minimized with the least number of components. FIG. 12 is a prediction plot of the predicted tensile moduli versus the manufacture (MFG) reported tensile moduli.

Figure 13:
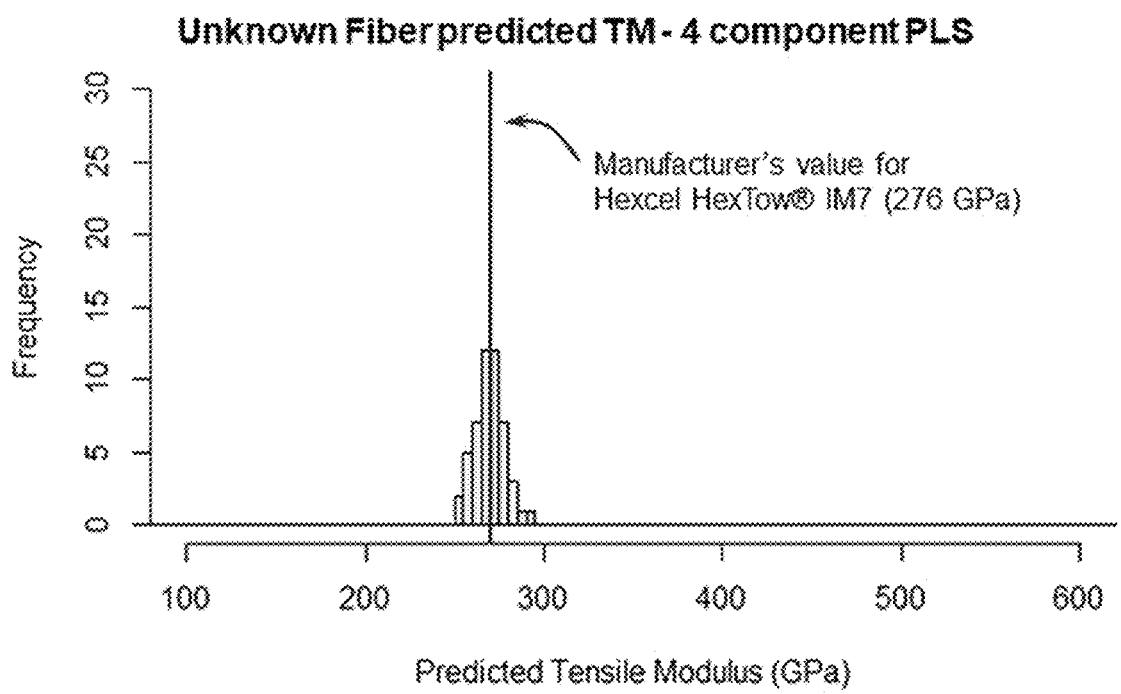
FIG. 13 presents a histogram of a 4-component PLS model prediction for tensile modulus of a carbon fiber as described herein and includes the manufacturer's reported value shown on the plot.

FIG. 13 was generated with the predict function in the pls package in R. The database data set and the unknown fiber data set were again inputs into the predict function in the pls package in R. FIG. 13 was generated by taking into account four (4) components for the PLS analysis, where the error was minimized with the least number of components. FIG. 13 is a histogram plot of the predicted tensile moduli for an unknown carbon fiber and the vertical line represents the tensile modulus reported by the manufacturer as indicated on the figure.

Disclosed methods can be utilized in a variety of different applications. Examples of beneficial application can include, without limitation, in situ nondestructive manufacturing quality control via the assessment of material properties within a production pipeline; material identity and material property quality assurance and verification within a carbon fiber supply chain (e.g. customer receipt inspection); and forensics and/or failure analysis for in-use carbon fiber materials; among others.

For example, an imbedded quality control process for a carbon fiber manufacturing application could entail in situ Raman spectral measurement, where a Raman spectrometer could characterize the fiber under multiple conditions as it leaves fiber sizing operations and prior to spooling and packaging. The Raman spectral information thus obtained could be reduced in real time and iteratively compared to a reference library as described above. The reference or confidence metric generated with reference of new and reference fiber can be a recordable quality metric of material produced. Statistically significant deviations between new and reference materials (e.g. drift in p-values) can then be recorded for evaluation.

In another representative embodiment, carbon fiber supply chain quality control can include Raman spectral analysis of carbon fiber material upon receipt, and reference of new materials with a reference material database as described herein. The reference or confidence metric generated with reference of new and reference fiber can be a recordable quality metric of material received and/or shipped. Statistically significant deviations between new and reference materials (e.g., drift in p-values) can be recorded for evaluation. Utilization of disclosed methods and metrics can provide supply chain quality assurance for both intermediates and end users of carbon fiber product.

In yet another example, counterfeit or failure analysis can be carried out for high value products, e.g., high-performance equipment formed of carbon fiber composite such as sports equipment (e.g., bicycles) where counterfeit carbon fiber of below specifications material properties is suspected. As with other use case applications, analysis of the fiber present in a commercial product in conjunction with a reference data set can allow for identification and/or reconciliation with original manufacturing specifications. In the event that an initial identification protocol fails to find a corollary material within the reference data, a secondary model such as the PLS model can be used to ascertain the counterfeit's material properties. Upon estimation of the bulk material properties, additional reference fibers with reported material property values similar to those predicted by the model can be examined to develop a new or larger carbon fiber reference data set. The PCA identification process can then be repeated so as to conclusively identify the suspect counterfeit fiber, or, if no match is again found, the process can be repeated. This process of examination and comparison to a reference data set, prediction of physical property, addition of new reference data, comparison against the new reference data, further prediction of physical properties, etc. can be iterated dependent on the use case application.

The present disclosure may be better understood with reference to the Examples set forth below.

Example 1

Micro-Raman spectra were acquired utilizing an InVia™ Reflex™ Confocal Raman spectrometer (Renishaw) coupled with two excitation lasers: a diode source single mode 785 nm, 100 mW and an Ar ion 514 nm, 50 mW laser. The instrument software, WiRE v4.2, was used to control all components of the system. The InVia™ Reflex™ was calibrated by an automatic offset correction based on the measured spectrum of an internal silicon reference chip for each laser and grating combination. The laser intensity at the sample was controlled with neutral density filters and the microscope objective selection. The InVia™ specifications included a spectral resolution of 0.3 cm$^{-1}$ (FWHM), spatial resolution (lateral)=0.25 µm, spatial resolution (axial)<1 µm. The InVia™ possessed automated beam steering optics, motorized components (Rayleigh slit, entrance slit, pinhole, multiple diffraction gratings, 100 cm$^{-1}$ Raman edge filters, plasma line rejection filters, and dual UV-enhanced deep depletion CCD detectors. The diffraction grating in use varied with laser selection. A 1200 grooves/mm grating was employed for all spectra acquired with the 785 nm laser. An 1800 grooves/mm grating was employed for all spectra acquired with the 514 nm laser. All spectra were acquired using a 100× objective and 1 inch CCD detector to interrogate the 100-3200 cm$^{-1}$ region. Multiple spectra were added at each data point; two 150 s acquisitions for all spectra acquired with 514 nm incident light and four 60 s acquisitions for spectra acquired with 785 nm incident light. All spectra were baseline corrected and filtered to remove cosmic rays. Laser power for all acquisitions was maintained between 1-2.5 mW/s.

Raw carbon fiber tow spools were purchased from a wide variety of manufacturers to build a reference database. Fiber types include those commonly utilized for golf clubs, car parts, the aerospace industry, military applications, etc., and cover the full range of strength and stiffness properties of all fibers currently produced. These known tensile strength and tensile modulus parameters were pooled with the spectral variables of interest.

Figure 14:
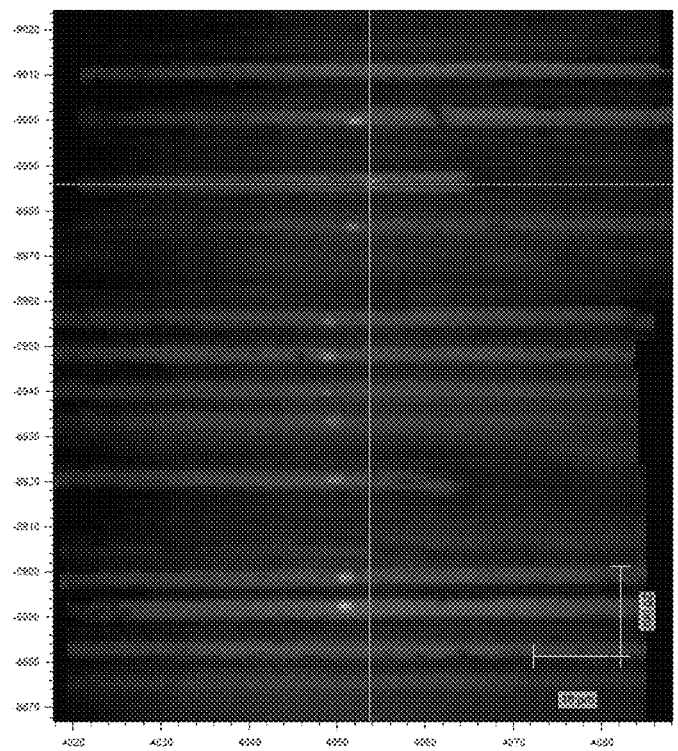
FIG. 14 illustrates carbon fibers aligned parallel to the 0-degree plane of polarization in a Raman spectroscopy process.

Approximately 1 cm of all fibers in tow were cut from each reference spool. Fibers were affixed to individual carbon sticky tabs mounted on an aluminum base. Tabs were then individually introduced into the microscope podule and optically aligned with their longitudinal axes laying parallel to the stage's x-axis. Analyses consisted of controlled fiber orientation to exploit spectral differences induced from incident polarization. Laser light emitted from the two wavelengths, 785 nm and 514 nm, was polarized in the X direction as part of their manufactured design. This directly translates to the microscope stage's x-axis. 25 replicate spectra were collected for all reference fibers at both excitation energies. This was achieved utilizing the InVia™ software point-mapping feature. The incident laser beam was focused at very low power on 25 different locations within the field of view; each chosen location being centered on top of a fiber (illustrated in FIG. 14 with 10 locations shown as lighter spots). Each (x,y,z) coordinate was saved by the software, then individually analyzed as the run was commenced. This process was then repeated with the fibers oriented perpendicular to the incident lasers polarization. Polarized light interacted with the fiber and Raman signal was collected in a 180° backscatter configuration. The technique was achieved using motorized polarization kits mounted onto each laser head. Each motorized kit contained a half-wave plate calibrated to a degree of rotation indicative of the deviation from the incident x-axis polarization; thus, the 0° and 90° positions refer to the incident polarization as being parallel to the x-axis or the y-axis, respectively. In Porto notation this is represented as parallel Z(X_)$\bar{Z}$ or perpendicular Z(Y_)$\bar{Z}$. The underscore denotes that the measured Raman signal is unpolarized. For simplicity, the spectral classes were referred to as 514 nm or 785 nm, and parallel or perpendicular oriented. This yielded 4 unique data sets (100 spectra) for each carbon fiber type used for modeling/predictions.

The Raman spectra database was broken into a "training" set of data and a "test" or "unknown" set of data. The "test" set included a single spectra from each Raman fiber type with the training set containing the remaining spectral data. The ability of the SIMCA model approach to correctly identify "unknowns" in the test set of data was then assessed. Unknown carbon fiber Raman spectra PCs were projected in known carbon fiber PCA spaces.

Figure 15:
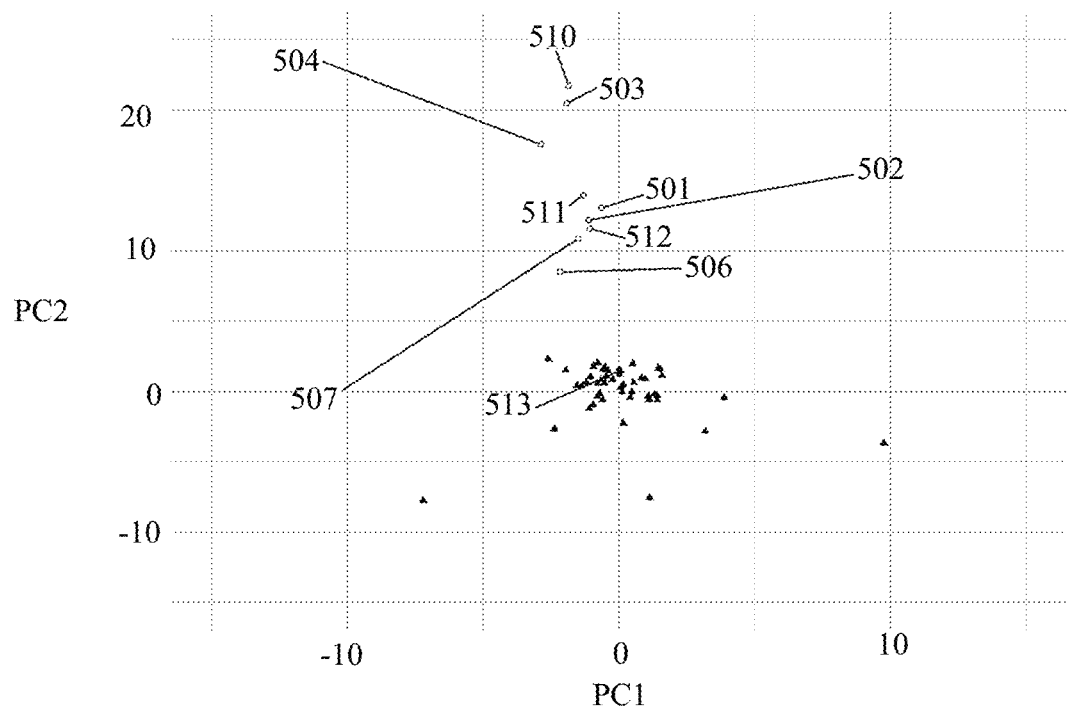
FIG. 15 presents a principal component plot showing the projection of data from 13 unknown carbon fibers into a two-principal component plot of a reference carbon fiber. Fibers 505, 508, and 509 are outside of the range of the plot.

FIG. 15 illustrates the Raman spectra from the test data set projected into the carbon fiber PCA space for a Thornel® VMX-24 carbon fiber. In FIG. 15, the test data set, or "unknowns", are represented as open circles and labeled from 501-513. The known identity of these fibers is listed in Table 2, below.

TABLE 2

| Fiber ID | Fiber Description |
| --- | --- |
| 501 | Hyosung Tansome ® H3055 |
| 502 | Hexcel ® Hercules HexTow ® IM7 |
| 503 | Hexcel ® HexTow ® IM7 |

TABLE 2-continued

| Fiber ID | Fiber Description |
|---|---|
| 504 | Hexcel ® HexTow ® IM7 |
| 505 | Hexcel ® HexTow ® HM63 |
| 506 | Hexcel ® HexTow ® IM10 GP |
| 507 | Hexcel ® HexTow ® IM10 GS |
| 508 | Amoco Thornel ® K1100 |
| 509 | Toray Torayca ® M40JB |
| 510 | Zoltek ™ PX35 |
| 511 | Toray Torayca ® T1000GB |
| 512 | Mitsubishi ® Pyrofil ™ TRH50 |
| 513 | Cytec Thornel ® VMX-24 |

The closed triangles on FIG. 15 represent the training set Raman spectra collected from the Thornel® VMX-24 data. The greater the distance an unknown point is from the known data points the more dissimilar the Raman spectra. Based on a visual inspection of the two component plot alone, it would appear that that only one unknown (Fiber ID 513) from the test set was similar to the reference Thornel® VMX-24 training set data. This was the case, as this unknown was in fact a Thornel® VMX-24 carbon fiber (Table 2).

Example 2

Raman spectral data was obtained as described above for a plurality of different carbon fibers that were randomly separated into test and training sets (script not shown). The training set of data was used to create PCA spaces specific to each carbon fiber type—13 fibers in total, with each fiber examined 50 times (script not shown). The ID and description for all 13 fibers are listed in Table 2, above. Table 1, presented above, describes the 36 different parameters used for the fibers.

Figure 16:
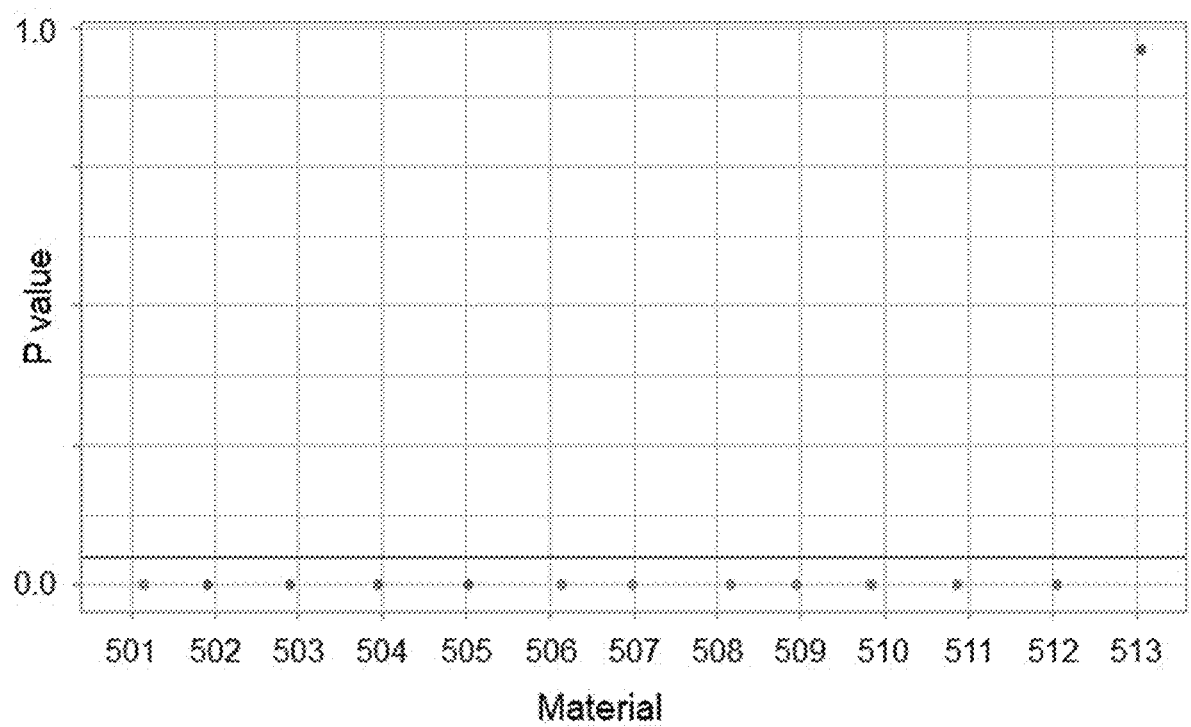
FIG. 16 presents a p-value plot for the projection results of each of the 13 unknown carbon fibers of FIG. 15 with regard to identification as a single known carbon fiber.

Using a multi-dimensional analog to the t-test, p-values associated with similarity of the known Thornel® VMX-24 PCA data set and the "unknown" test data Raman spectra were calculated (FIG. 16). Based on these results, one can exclude with greater than 95% confidence (the p=0.05 line on FIG. 16) Thornel® VMX-24 as the carbon fiber type for all but one (number 513 on FIG. 16) of the test set data points. Accordingly, because this unknown and the training set Thornel® VMX-24 cannot be differentiated the unknown can potentially be identified as a Thornel® VMX-24 carbon fiber.

While certain embodiments of the disclosed subject matter have been described using specific terms, such description is for illustrative purposes only, and it is to be understood that changes and variations may be made without departing from the spirit or scope of the subject matter.

What is claimed is:

1. A computer-implemented method for identifying a carbon fiber comprising:
   obtaining Raman spectral data of an unknown carbon fiber from at least two different examination conditions, wherein the examination conditions include a laser irradiation focus spot location about 5 micrometers or more from an end of the unknown carbon fiber;
   extracting, by a computing system comprising one or more computing devices, a plurality of parameters from the Raman spectral data of the unknown carbon fiber;
   projecting, by the computing system, the Raman spectral data parameters of the unknown carbon fiber into a plurality of principal component spaces, each principal component space being associated with a single reference fiber, each principal component space comprising at least a first principal component and a second principal component of Raman spectral data of the single reference fiber associated with that principal component space, the Raman spectral data of each reference fiber having been obtained at the at least two different examination conditions; and
   assigning, by the computing system, an identity to the unknown carbon fiber based upon the results of a similarity test between the projected Raman spectra data and each principal component space.

2. The computer-implemented method of claim 1, wherein the at least two different examination conditions include at least two different excitation wavelengths.

3. The computer-implemented method of claim 1, wherein the at least two different examination conditions include at least two different fiber orientations with reference to an excitation laser polarization direction.

4. The computer-implemented method of claim 1, wherein the plurality of parameters for the unknown carbon fiber includes a D-band location, a G-band location, and a valley (V) location.

5. The computer-implemented method of claim 4, wherein the plurality of parameters for the unknown carbon fiber further includes a D-band intensity, a G-band intensity, a valley (V) intensity, a DIG intensity ratio, a DN intensity ratio, and a GN intensity ratio.

6. The computer-implemented method of claim 1, wherein the Raman spectral data for the unknown fiber includes multiple measurements at each examination condition.

7. The computer-implemented method of claim 1, wherein the step of obtaining the Raman spectral data comprises modifying raw Raman spectral data.

8. The computer-implemented method of claim 7, wherein modifying raw Raman spectral data comprises performing at least one of data smoothing, background subtraction, baseline correction, and area normalization.

9. The computer-implemented method of claim 1, the principal component space of each reference fiber comprising one or more additional principal components of the Raman spectral data of that reference fiber.

10. The computer-implemented method of claim 1, wherein projecting, by the computing system, the Raman spectral data parameters of the unknown carbon fiber into the plurality of principal component spaces comprises projecting, by the computing system, the Raman spectral data parameters of the unknown carbon fiber into at least 10 or more principal component spaces, each of which being associated with a single reference fiber.

11. The computer-implemented method of claim 1, wherein projecting, by the computing system, the Raman spectral data parameters of the unknown carbon fiber into the plurality of principal component spaces comprises projecting, by the computing system, the Raman spectral data parameters of the unknown carbon fiber into at least 20 or more principal component spaces, each of which being associated with a single reference fiber.

12. The computer-implemented method of claim 1, wherein the unknown fiber is assigned multiple identities, each of which being a member of a carbon fiber class.

13. The computer-implemented method of claim 1, wherein the unknown fiber is assigned a null identity.

14. The computer-implemented method of claim 1, wherein the unknown fiber is assigned a single identity.

15. The computer-implemented method of claim 1, wherein the similarity test comprises a soft independent modelling by class analogy.

16. The computer-implemented method of claim 1, wherein the similarity test comprises determining a distance from a projection of the Raman spectral data to a principal component of a principal component space.

17. The computer-implemented method of claim 1, further comprising estimating a physical property of the unknown fiber.

18. The computer-implemented method of claim 17, wherein the step of estimating the physical property comprises carrying out a partial least squares regression of the Raman spectral data parameters of the unknown carbon fiber and comparing the results to a partial least squares regression of the Raman spectral data of each reference fiber.

19. The computer-implemented method of claim 17, wherein the physical property comprises a tensile property, a flexural property, a thermal property, or any combination thereof.

20. A computer-implemented method for identifying a carbon fiber comprising:
    obtaining Raman spectral data of an unknown carbon fiber from at least two different examination conditions, wherein the at least two different examination conditions include at least two different excitation wavelengths;
    extracting, by a computing system comprising one or more computing devices, a plurality of parameters from the Raman spectral data of the unknown carbon fiber;
    projecting, by the computing system, the Raman spectral data parameters of the unknown carbon fiber into a plurality of principal component spaces, each principal component space being associated with a single reference fiber, each principal component space comprising at least a first principal component and a second principal component of Raman spectral data of the single reference fiber associated with that principal component space, the Raman spectral data of each reference fiber having been obtained at the at least two different examination conditions; and
    assigning, by the computing system, an identity to the unknown carbon fiber based upon the results of a similarity test between the projected Raman spectra data and each principal component space.

21. A computer-implemented method for identifying a carbon fiber comprising:
    obtaining Raman spectral data of an unknown carbon fiber from at least two different examination conditions, wherein the at least two different examination conditions include at least two different fiber orientations with reference to an excitation laser polarization direction;
    extracting, by a computing system comprising one or more computing devices, a plurality of parameters from the Raman spectral data of the unknown carbon fiber;
    projecting, by the computing system, the Raman spectral data parameters of the unknown carbon fiber into a plurality of principal component spaces, each principal component space being associated with a single reference fiber, each principal component space comprising at least a first principal component and a second principal component of Raman spectral data of the single reference fiber associated with that principal component space, the Raman spectral data of each reference fiber having been obtained at the at least two different examination conditions; and
    assigning, by the computing system, an identity to the unknown carbon fiber based upon the results of a similarity test between the projected Raman spectra data and each principal component space.

* * * * *